US007114127B2

(12) United States Patent
Weitzman

(10) Patent No.: US 7,114,127 B2
(45) Date of Patent: Sep. 26, 2006

(54) METHOD, SYSTEM AND PROGRAM PRODUCT IN A MODEL-VIEW-CONTROLLER (MVC) PROGRAMMING ARCHITECTURE FOR INTER-OBJECT COMMUNICATION WITH TRANSFORMATION

(75) Inventor: Louis M. Weitzman, Brookline, MA (US)

(73) Assignee: International Business Machines Corporation, Armonk, NY (US)

( * ) Notice: Subject to any disclaimer, the term of this patent is extended or adjusted under 35 U.S.C. 154(b) by 636 days.

(21) Appl. No.: 10/109,325

(22) Filed: Mar. 28, 2002

(65) Prior Publication Data

US 2003/0197726 A1    Oct. 23, 2003

(51) Int. Cl.
*G06F 17/00* (2006.01)
(52) U.S. Cl. ...................... 715/764; 715/700
(58) Field of Classification Search .............. 715/760, 715/762, 769, 853, 763
See application file for complete search history.

(56) References Cited

U.S. PATENT DOCUMENTS

| | | | |
|---|---|---|---|
| 5,892,949 A * | 4/1999 | Noble ........................ 717/125 |
| 5,926,177 A | 7/1999 | Hatanaka et al. ........... 345/340 |
| 6,044,394 A | 3/2000 | Caddan et al. .............. 709/107 |
| 6,115,646 A | 9/2000 | Fiszman et al. ............ 700/181 |
| 6,211,878 B1 | 4/2001 | Cheng et al. ............... 345/357 |
| 6,556,539 B1 * | 4/2003 | Henderson .................. 370/217 |
| 2002/0143800 A1 * | 10/2002 | Lindberg et al. ............ 707/201 |
| 2003/0145305 A1 * | 7/2003 | Ruggier ...................... 717/100 |

OTHER PUBLICATIONS

"ORB Basics", http://www.omg.org/gettingstarted/orb_basics.htm, Object Management Group, pp. 1-8, no date.
"CORBA Basics", http://www.omg.org/gettingstarted/corbafaq.htm, Object Management Group, pp. 1-5, no date.

\* cited by examiner

*Primary Examiner*—Kristine Kincaid
*Assistant Examiner*—Thanh Vu
(74) *Attorney, Agent, or Firm*—John E. Campbell

(57) ABSTRACT

A system, method and program product in a Model-View-Controller architecture for communicating between objects such as a Model object and a View object. A transform object is provided in the interface between any of the conventional Model, View and Controller objects such that transformation of data types into appropriate other data types is accomplished outside of the MVC object. This relieves the recipient MVC object of the responsibility of being designed to support multiple data types in order to perform a function.

36 Claims, 14 Drawing Sheets

Java's Prior art Model-View-Controller Architecture

METHOD, SYSTEM AND PROGRAM PRODUCT IN A MODEL-VIEW-CONTROLLER (MVC) PROGRAMMING ARCHITECTURE FOR INTER-OBJECT COMMUNICATION WITH TRANSFORMATION

The present invention is related to providing user recognizable information in a data processing system, and is more particularly related to providing video, audio or tactile information views in a model-view-controller architecture.

BACKGROUND OF THE INVENTION

When displaying, monitoring and exploring a complex system, a Model-View-Controller (MVC) architecture is often adopted. The MVC architecture breaks up the components of a program into three entities (FIG. 1), Model 1, View 3 and Controller 2. The MVC architecture was introduced as part of the Smalltalk-80 version of the Smalltalk programming language. It was proposed to reduce the programming effort to design systems that utilized multiple views of the same data. The idea was to automatically update changes in the Model 1 in each of the associated views. The concept was later adopted in Sun Microsystems' Java MVC architecture.

Information programmably displayed that provide user interpretable information are often called "widgets". Widgets include such things as displayed buttons, pull-down menus, icons, progress indicators, scroll bars, windows and the like. Their purpose is to provide information via graphical user interfaces (GUIs) for communicating between a program and a user. The term widget is also used to represent the small program that describes the user perceived widget.

The Model 1 is the object that represents the data in the program. It manages all data and performs all data manipulation and transformation. The model doesn't have specific knowledge of the View(s) 3 or Controller 2. The system is responsible for maintaining links between the model and its views and the system notifies the views when the model changes (due to data operations or user interactions). The View 3 is the object responsible for the presentation of Model 1 information to a user display. The View 3 interacts with the model 1 by referencing the model 1. The Controller 2 object manages interactions among the user 4, the model 1 and the view 3 by way of the user interface (UI) 5. The UI 5 presents images to the user 4 via computer displays, printers and the like and receives input from the user 4 by many means, including, but not limited to computer mouse, keyboard, touch-screen, tablet, audio, video, digital devices and computer networks. The Controller 2 interacts with the model 1 by referencing the model 1. Interactions among objects may take the form of messages sent from one object to the next. Other interaction methods are well known in the art and the invention described herein is not restricted to the example of messages.

Frequently, however, there are changes to the type and form of the information that the View 3 presents. It may change as the task the user performs evolves over time, or it may change depending on the specific task the user is performing.

For example, creating, executing and monitoring distributed applications that run on multiple hosts and are connected with a high speed data transport mechanisms, requires several views of many types of information. During initial development of the application, the user is interested primarily in the structural representation of the data flow among various applications of distributed hosts and requires views that support development. When the application is initially run (before it is completely debugged), the user is interested in both the states of the components and the interconnections between components (for example, if a component appears to be stalled, it may be because it is not running correctly or it may be because the data it requires is not being delivered, or the data it is generating is not being consumed). Unique views are needed for the debug state. Once the application is complete and the user starts running it, the user is more interested in the specific state of the components of the application (whether job steps are running or stalled, whether data transfer is occurring, and, if so, the transfer rate). When a distributed application is complete and is being used in production, the user is less interested in the specific state of the components of the applications and more interested in an overall summary of the state of the distributed job. Unique production views are needed at this stage. Controlling the overall application involves views that are similar to those required for monitoring because improperly affecting the control flow (such as abnormally terminating a component or restarting one out of sequence) can have a ripple effect that produces undesirable results.

Unfortunately, a single View 3 is not well suited to present all types of information. Graphical views are good for structure, but tend to become cluttered and unusable as specific textual information is added to them. List-type textual displays can present a lot of detailed information in a compact space, but give no information about structure. List-type textual displays are also ineffective for representing summary information (such as the progress the job is making toward completion). Measurement displays (such as bar graphs or meters) are ideal for presenting overall summaries, but give no information about structure or detailed states. In other instances, several views might be used to represent different aspects of a three dimensional object.

This has been addressed in the past in three ways. The first has been to choose a single view and add the additional information to it as needed. Typically a graphical view is chosen because it is initially easier to visualize the entire system, and mechanically it can accept the additional information that will be required later (it is easier to add text to a graphical view than graphics to a textual view). There is a practical limit to how much detailed information can be added to a graphical view as the screen real estate becomes cluttered and the information is obscured. In order to utilize this approach, a user must maintain the amount of detailed information below some threshold by selectively closing old detailed information as new information is requested.

The second approach has been to replace the View 3 object in the Model-View-Controller configuration as the type of information the user is interested in changes. When the user is no longer interested in the structure of the distributed application and becomes interested in the detailed state of the components, the structure view is replaced with a detailed state view. The problem with this approach is that the new view must be recreated on demand and inserted into the Model-View-Controller configuration. Even if the old view is preserved when the user switches out of a particular mode (switching from structure to state views, for example), there is expense involved when the old view is reused (switching back to structure from state). The old view must be reconnected with the model and controller, and it must be made current to reflect any model changes that occurred when it was not active. This expense is enough to inhibit the user from switching between views freely.

The third approach, U.S. Pat. No. 5,926,177 "Providing Multiple Views In A Model-View-Controller Architecture" assigned to International Business Machines and incorporated herein by reference, enhances the traditional MVC architecture by providing a "virtual" View (View Proxy) controlling multiple views. The View Proxy determines to which Views the model change notifications are to be sent and sends model change information to only those views effected.

In the prior art MVC architecture, a view must be designed with knowledge of the type of data it is receiving. The "translation" of data in the View object makes the View object less flexible and portable since it is expecting a specific format from the Model it is attached to. A MVC method is needed to allow the View object to be independent of data type presented by the Model.

SUN Microsystems' Java Model-View-Controller, is shown in FIG. 2, wherein the view 3 and controller 2 are combined into a single component 201. In Java it is combined into the single ComponentUI element 201. Most of the Java Swing interface widgets employ the MVC way to visualize data. This enables multiple User Interface (UI) components to translator into the same model data and be appropriately updated when changes occur. This modularity provides great flexibility One problem with this approach is that each view must know how to interpret the model data. That knowledge, in the prior art, has been embedded in the view object.

SUMMARY OF THE INVENTION

The present invention provides an improved Model-View-Controller (MVC) architecture; i.e. the "Model-View-Controller with Translator" (MVCT) architecture. The MVCT architecture FIG. 3A provides for translator objects 301, 304 to be introduced between objects traditionally found in the MVC architecture. The example translator 1 301 operates on the data to be displayed (the model 303) from the presentation of the data (the view 302) and example translator 2 302 operates on the interaction from the user (the controller 2) with the process and data (model 303). This invention enhances the communication between the components to include a mapping facility (Translator 301, 304) to transform data between the underlying model 1 and the viewable attributes in the interface. For example, a possible transformation 301 could be from a Boolean value of (True, False) to a color attribute (green, red). The transformation 304 allows interaction from the controller 2 to modify the underlying model data 303 as well. In this way, the presentation of data is further abstracted from the underlying data model. By enhancing the MVC architecture, dynamic visualizations of model data becomes more modular and easier to handle dynamic applications.

It is therefore an object of this invention to provide a translation between an MVC model, MVC view or MVC controller.

It is yet another object of this invention to provide a common translation object for two or more MVC objects.

It is a further object of this invention to translate type information from a model into display mode data presented to a view in an MVC architecture.

It is still another object of this invention to translate user interface action data from a controller to type data presented to a model in an MVC architecture.

These and other objects will be apparent to one skilled in the art from the following detailed description of the invention taken in conjunction with the accompanying drawings in which:

DESCRIPTION OF THE PREFERRED EMBODIMENT

Figure 1:
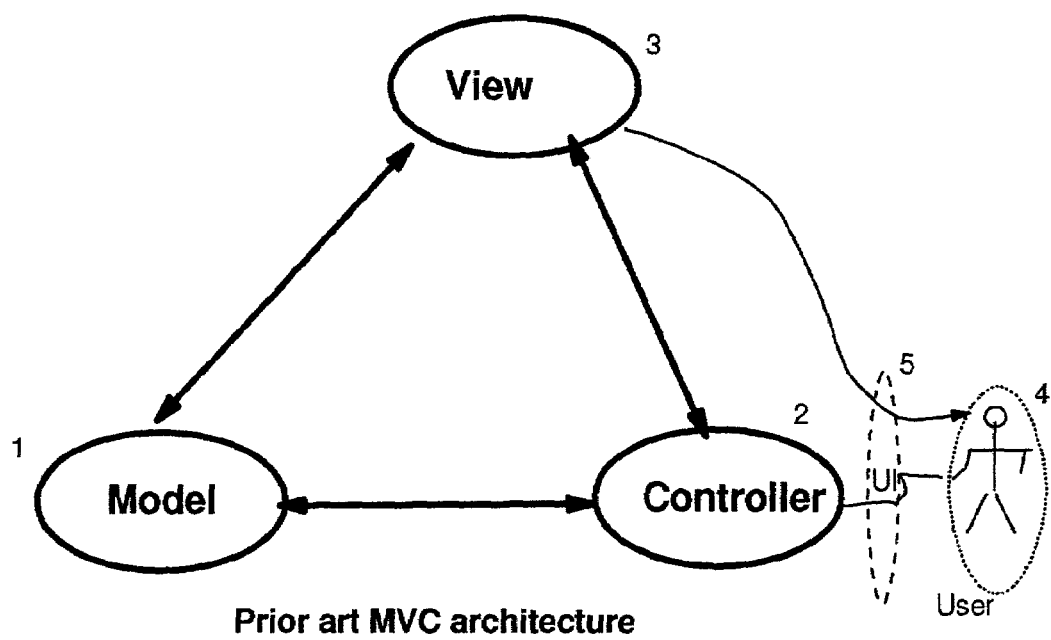
FIG. 1 is a diagram depicting the elements of the prior art MVC architecture.
Figure 2:
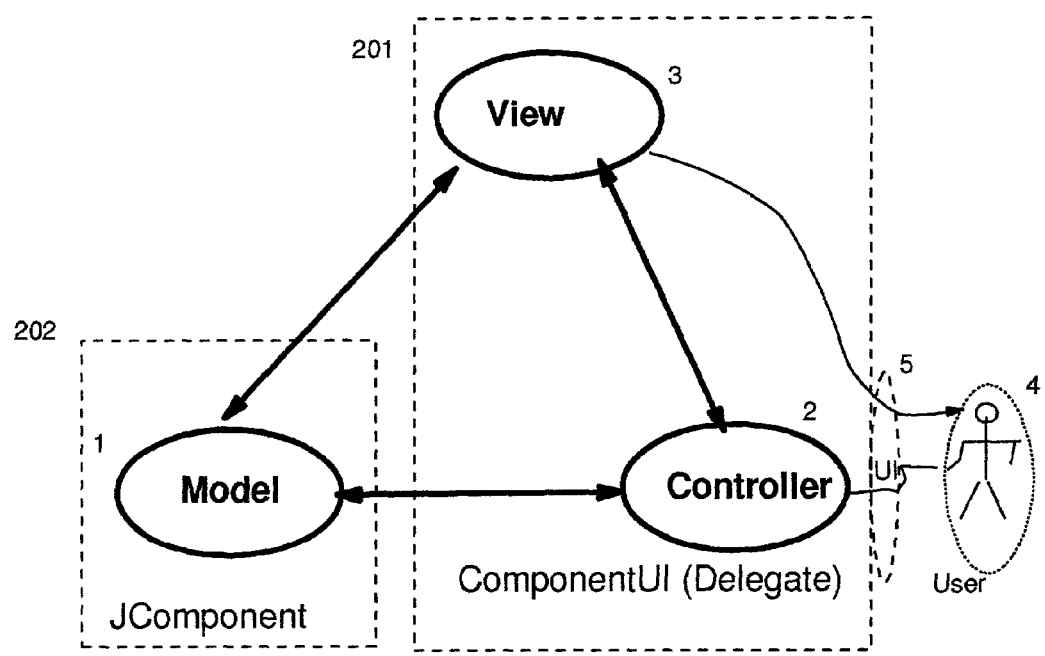
FIG. 2 is a diagram of Sun Microsystems' Java MVC architecture.
Figure 3A:
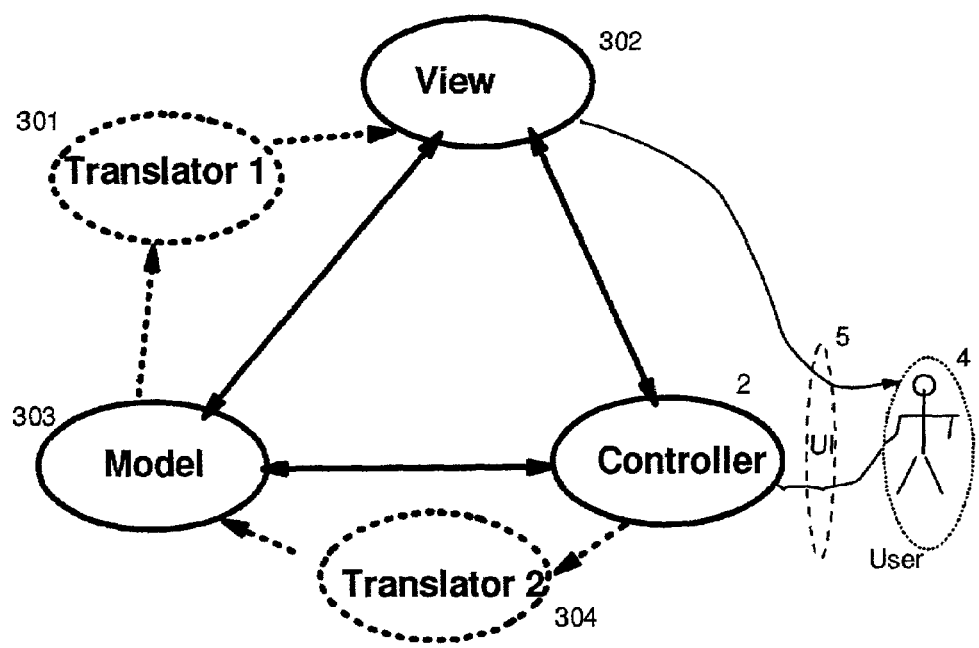
FIG. 3A is a diagram of an example embodiment of the present invention utilizing multiple translator objects.
Figure 3B:
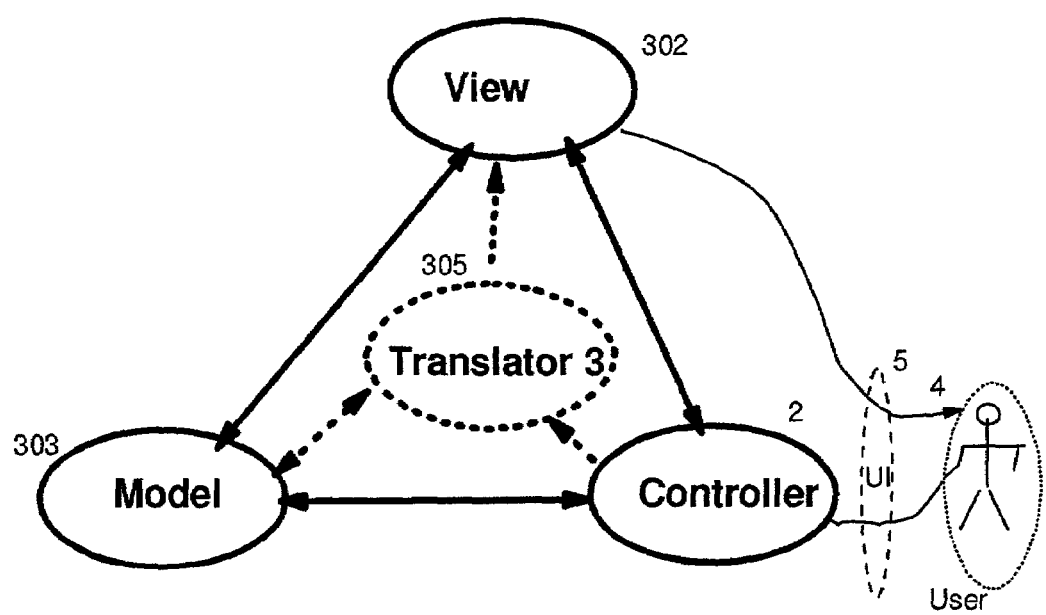
FIG. 3B is a diagram of an example embodiment of the present invention utilizing a shared translator object.

The present invention FIGS. 3A, 3B introduces a new translator object into the MVC architecture. Traditionally, MVC consisted of three objects FIG. 3A, the model object 303, the view object 302 and the controller object 2. These objects are programmably interconnected by an interface. The interface in one embodiment consisted of messages sent from one object to another object. The message was stimulated by events within the sending object. In FIG. 3A, the interface consists of translator objects (translator 1 301 and translator 2 304). The translator objects are responsible for transforming the information they receive from one object to a form that is useful for the next.

MVC objects may comprise variables and objects and processes. For example, the model comprises a model process that manipulates the values of model variables and model object. The basic types that are represented in the MVC objects are dependent on the programming language.

A MVC model will typically include the types of:

Bit (binary)
Byte
Character
String
Boolean

Integer
Short
Long
Floating point
Double
Time stamp (time, date)

These basic types can be grouped into sets by various means including:

Enumeration (with index, a sequence of above types)
Objects (with accessor methods)
Vectors (with index)
Arrays (with index)
Hash tables (with key)

Each of these example grouping techniques include a specifier to indicate which basic type in the group is relevant. For example, a vector has an index while an object will use an accessor method to access the basic type.

In addition, on the view side, there are display types and attributes that can be identified. These display types form the basis of the transformation objects conversion process are well known. In the visual domain, example of these types include:

Position (x, y, z)
Size
Value (degrees between black and white)
Texture
Text
Orientation
Color
Shape
Transparency (including visibility)

In the example embodiment FIG. 3A, the translator 1 object 301 separates the knowledge in the view object of how to interpret the model 1 data from the view object into an independent object that knows how to transform model data into viewable attributes. This is done by a Translator 301. The Translator is a mechanism that allows Model data 303 to be translated into View object data 302 and be appropriately updated when changes occur in the Model data 1. This more modular way to represent data and separate it from its visualization in an application allows for more dynamic capabilities of creating and modifying views on the fly, both automatically and interactively.

Similarly, translators could be introduced between the controller 2 and model 303 objects or the controller 2 and view 302 objects. In the example implementation Translator 2 304 is introduced between the controller 2 and model 303 and may be used to transform, for example, mouse events (position, left click, double click and the like) to model data types (Boolean, integer, string for example).

FIG. 3B is an example embodiment where the function of the translator objects in FIG. 3A 301, 304 is combined into a single translator object Translator 3 305.

Figure 4A:
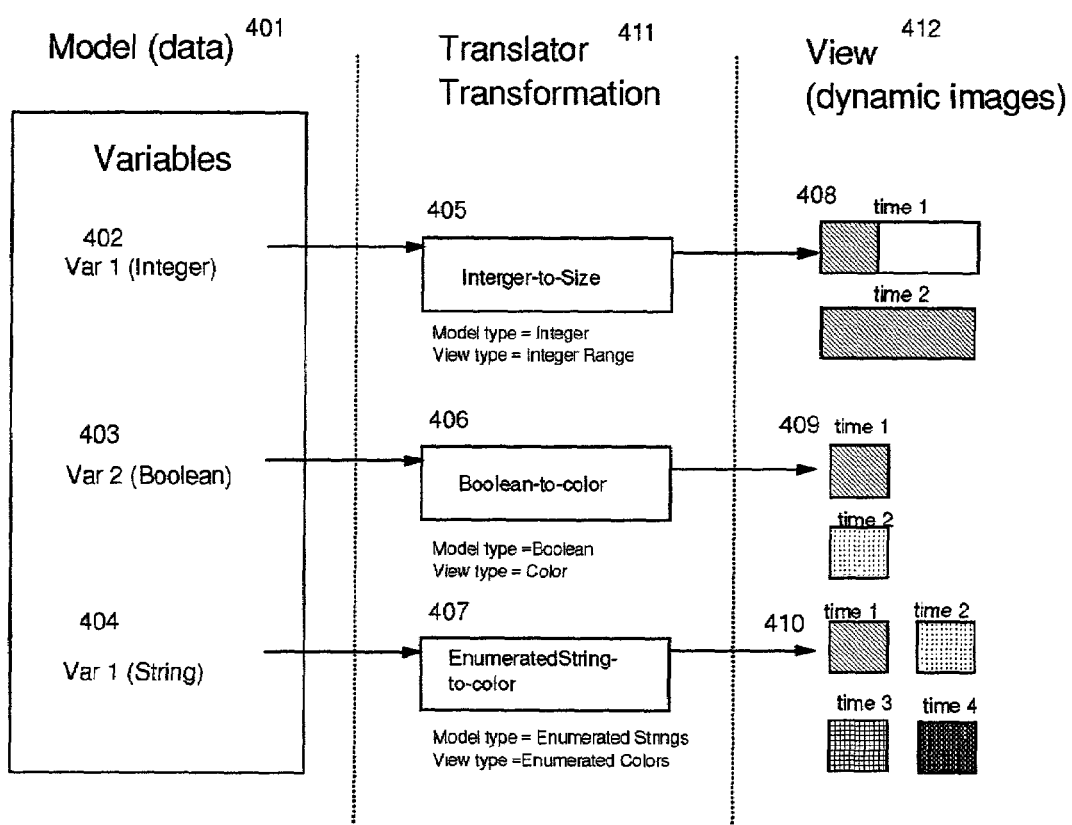
FIG. 4A depicts the operation of an example Model to View translator according to the present invention.

Translator Mechanism:

An example Model to View translator mechanism is diagrammed in FIG. 4A. The model 401 is represented as a block on the left (with various example model variables 402, 403, 404 indicated). The translation is represented in the center column as individual blocks 405, 406, 407 (including the model type to view type indicated) and the view images 408–410 are presented on the right. As data changes over time in the model (time1, time2, etc. 408, 409, 410), the data flows through the translator 411 and is transformed into displayable attributes for a view. Thus, the image or view does not have to know how to transform a model value into a value to use for one of its attributes (size, color, position, label, etc).

MVCT external events occur by way of the user interface (UI) and include information conveyed to the MVCT system (MVCT input) as well as information conveyed from the MVCT system (MVCT output). Example external input interactions are through the mouse and keyboard but other interaction modalities are also possible (e.g., voice, touch screen, network, attached storage etc.). Example external MVCT output events include but are not limited to visual image display LCD, CRT, projections, printer, robotics, audio, video, networks and storage devices.

Figure 4B:
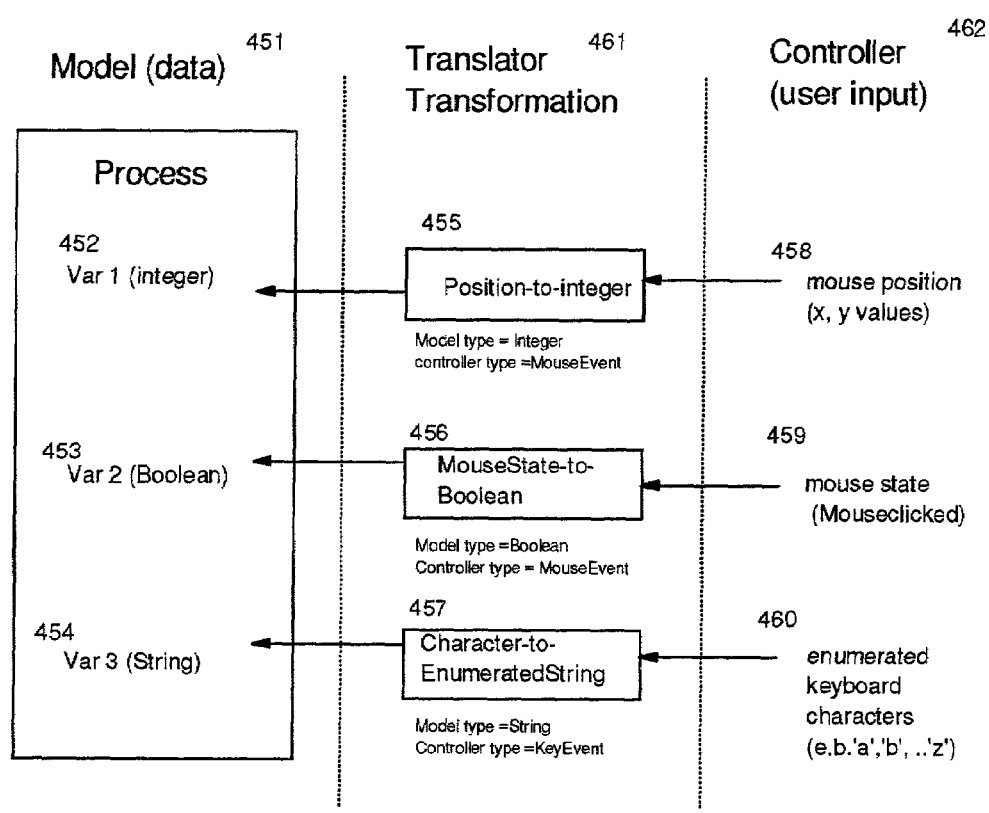
FIG. 4B depicts the operation of an example Controller to Model translator according to the present invention.

In another embodiment FIG. 4B, the invention provides for Controller 462 to Model 451 translation. An external event is communicated by way of a "user interface" UI to the controller object. The input from the interaction is encapsulated into an event (e.g., Mouse Event 458, 459 Key Event 460, etc.) and the appropriate information is encapsulated in that event. Each viewable image has an associated controller object. The controller listens for meaningful events and forwards them to their relevant transformation objects 455, 456, 457. There may be more than one transformation object per controller.

In FIG. 4B, the first example illustrates a mouse position 458 which is provided to the transformation object 455 which transforms the mouse position into an integer value for the model 451. The second example 459, a mouse click toggles its state between two states. When a mouse-click event occurs, it is forwarded to the transformation object 456 which transforms the toggle information into a MouseEvent. Finally, the last example 460, illustrates a model value that can take an enumerated set of possible values. When the appropriate keyboard event occurs, the transformation object 457 translates that event to the appropriate state in the enumerated string presented to the model 451.

Any number of transforms could be conceived and implemented using the teaching of the present invention. Only a few have been demonstrated in order to teach the concept of the invention but any other transform used in this way would be consistent with the invention.

Model Process

Figure 5:
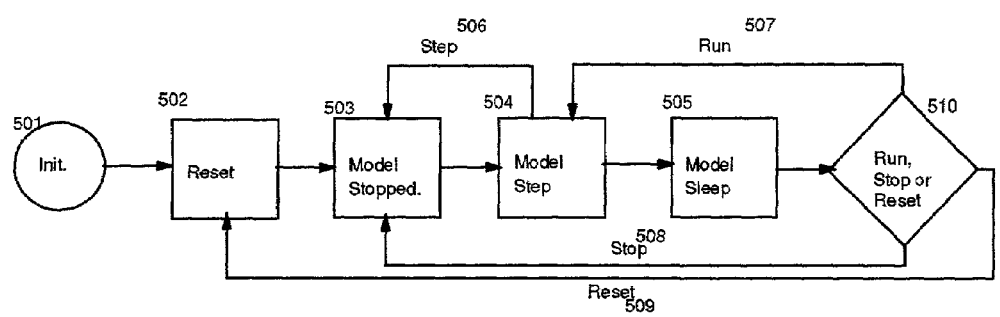
FIG. 5 is a diagram of the process of running, stopping, stepping a model, which is a process that updates the model data.

The model 1 is an independent module that provides the access points for the translators to hook into. In this example implementation, models conform to a Java interface enabling the system to manipulate the model object. FIG. 5 illustrates the simple user controlled states that the models in this embodiment follow. They are first reset (502) to their beginning configuration and put into a stopped state (503). The model can then be started and run continuously (507), stopped (508), reset (509), or be interactively stepped (506). Between each step of the model, it is possible that the model waits or sleeps (505) before continuing to the next step. This enables the model to be controlled and provide a better visualization.

In this embodiment, the model is an object and elements in the model can be used in translators. These elements currently include (but are not limited to) instance or class variables, objects (with accessor methods), and vectors or arrays.

Figure 6:
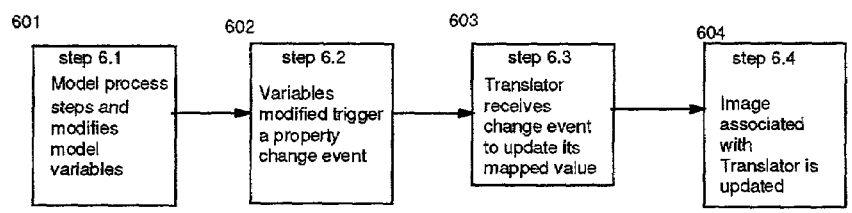
FIG. 6 is a diagram of the running model updating the view.

FIG. 6 demonstrates an example interface path operation in a transform between a model object and a view object by way of a translator object.

On each tick of the model clock, the variables in the model are updated 601. As they are updated, events are triggered in the simulation system to indicate a change to a particular model element has occurred 602. This event causes the translators associated with the model element to be updated 603 and, in turn, they update their associated images (views) 604. This is an automatic process. The following steps (6.1–6.4) FIG. 6 explain the example model process interface steps. (This sequence is the same as step 504 in FIG. 5).

Step 6.1: Model Process Steps 601:

Function

The model steps to the next time slice and updates the objects and variables as needed.

Input

The model 1 may get input from external sources, AtoD converters, other processes, or the user by way of the controller 2.

Output

The model state is updated to be consistent for the next step in the model. For live data, the model variables may be continuously updated.

Description

The model updates its state based on one tick of the model clock. The state of the model is now in state n+1 where n is the previous state. The input can come from a variety of sources including the user, AtoD converters (if the model is meant to visualize some externally instrumented device), publish-subscribe data, etc. The model, in this embodiment, is implemented as a Java class.

Step 6.2: Variables Trigger Event 602

Function:

The model triggers an event for each element in the model that has been modified signaling to the system that an update to that model element has occurred.

Input:

Knowledge that an Update Occurred is the input.

Output:

An event is created and triggered to indicate that the update occurred.

Description:

In this embodiment, Java events are used to trigger updates for modified model elements. Only the modified elements trigger an event.

Step 6.3: Translator Receives Event 603

Function

The appropriate translator objects receive an event indicating it needs to update its mapped value.

Input

Input comes from the model variable to which the individual translator is connected. The old and new model values are provided.

Output

The mapped value that is ready to be used by the image for a visible attribute.

Description

At creation time, there is a mapping between elements and translator objects that is recorded. This is used to signal an update to the translator object which then updates its mapped value from the model data. Each translator knows how to transform a specific model type into a specific viewable attribute.

Step 6.4: Image is Updated 604

Function

The images visual presentation is changed to reflect the new model state.

Input

Data from the translators are used in redrawing the image's presentation.

Output

The visual presentation of the image changes.

Description

The each image is updated as it needs to be based on the new information provided to the image by its various translators. Each translator has transformed the model data into displayable attributes and the images use those attributes to modify its presentation.

Figure 7:
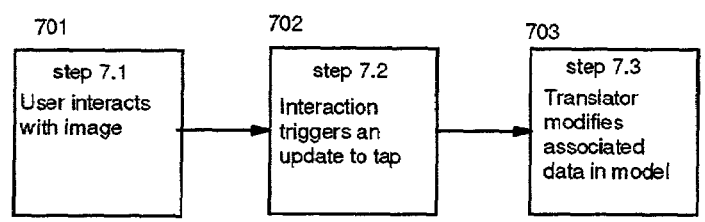
FIG. 7 is a diagram of a user interacting with a view to update a model.

When the user interacts with an individual image in a view (by way of a keyboard or mouse entry) the UI presents information to the controller object that triggers an update in the model via its translators. This is an interactive process and is demonstrated in FIG. 7 steps 701–703.

Step 7.1: User Interacts with Image 701

Function

The user interacts with an image in the view with the intention of updating a variable in the model (keyboard entry event).

Input

The input is the user's action related to a particular image.

Output

The output is an event triggered on the internally associated translators. There could be more than one translator affected.

Description

When the user interacts with an image, it triggers an event on each of the internal translators to potentially update their value. This interaction may be a click on a button image, or a click-drag operation on a slider, etc.

Step 7.2: Interaction Triggers Update to Translator 702

Function

The interaction sequence in the interface triggers an update to each of the internal translators.

Input

An event (mouse event or keyboard event, etc.) is registered in the interface.

Output

The output is a signal to the translator to update its model values.

Description

As the user interacts, events are received in the image and they are transferred to their associated translators to update their model values.

Step 7.3: Translator Modifies Data in Model 703

Function

The model is updated by each translator in the image in which the user has interacted.

Input

Event from image is transferred to the translator object.

Output

The translator updates the appropriate model values.

Description

The translator object takes information from the event and uses that to update the value in the model. Each translator transforms the event information into the appropriate model data. Each translator knows specifically how to update its typed data in the model.

Figure 8:
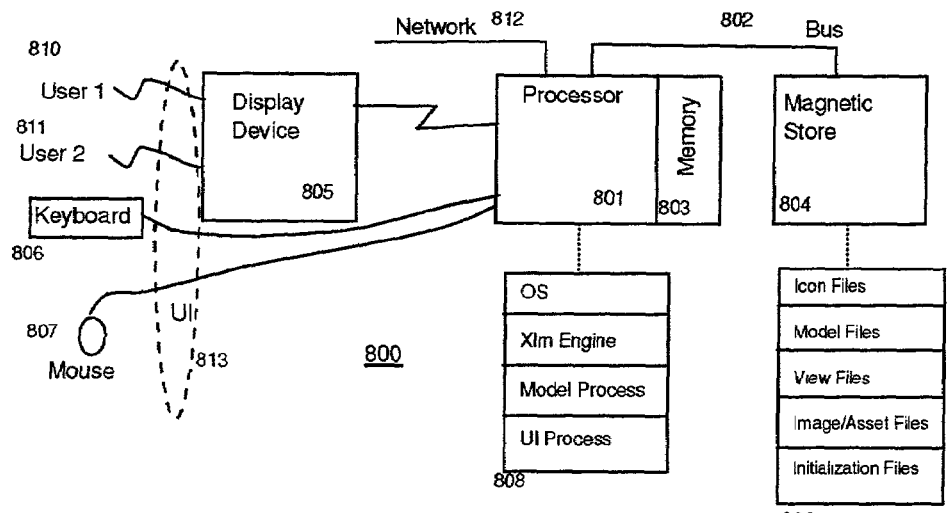
FIG. 8 is a diagram of an example system using the present invention.

System Diagram FIG. 8

An example system for implementing the present invention is displayed in FIG. 8. Elements of an example system include, a processor 801, Processor Memory 803, disk storage 804, user interface display device 805, keyboard 806, mouse 807. The disk storage 804 is typically magnetic or optical media and is typically connected via a bus 802. The processor system interacts with remote processors by way of a network. The network may be a tightly coupled one where the processors cooperate with some common controls or it may be the World Wide Web and Internet where the processors may be very independent. The processor executes programs that are loaded from Magnetic Storage 803 or other means such as from the Network interface 812. These programs 808 include an operating system (OS). The simulation environment, Xim Engine 808 is the embodiment of the visualization system previously described in this patent. The Model Process 808 is the independent model running in its own thread. The UI Process 808 handles all the interaction with the user and is hooked up to the controller of the MVC architecture. The current embodiment also stores information 809 in the file system 804. These files 809 include: initialization information and user preferences composite image files constructed from image component pieces, model description files describing the model elements that can be translated, view files that define a view and describe the size and location of all the images along with their translators, and any file assets used for image creation, such as audio and image files. Except for the asset files, all files are stored in XML format. The processor system is shown by way of example and various methods known in the art may be used to support the invention. For example, any or all of the MVC components can is some embodiments span multiple processing systems.

Java Program Example:

The following code is an example a program representation demonstrating Model-View Java Interface's for the simulation environment.

In the simulation environment, XimEnv, there are a number of Java interfaces that work together to help define the different components. Each object (model, view and translator) in the system must conform to one of these interfaces as appropriate. There is the "ModelInterface" (for the model objects), the "IconInterface" (for the view objects) and the "TapInterface" (for the translator objects of the present invention). The actual Java code and a short description are included below for these definitions. Example code for a model "BasicModel", a translator "TapContinuousTo-Color", and a view (icon) "BarIcon" are given after the definitions of the interfaces. Another interface (not shown here) is for a view manager that manages and controls the different views in the system.

TABLE 1

ModelInterface

```
/**
 * basic interface for creating models to translate
 *
 * Creation date: (10/4/2001 3:29:15 PM)
 * @author: Louis Weitzman
 */
public interface ModelInterface
/**
 * return the display name for this model
 *
 * Creation date: (10/4/2001 3:45:29 PM)
 * @return int
 */
String getName( );
/**
 * return the number of seconds between ticks in the model
 *
 * Creation date: (10/4/2001 3:45:29 PM)
 * @return int
 */
int getSleep( );
/**
 * Method to setup the initial state of the model.
 * Sets up all model library items, whether derived automatically from
 * public fields, or manually constructed.
 * Calls reset to go to beginning state and might do additional work
 * to initialize model.
 *
 * Creation date: (10/5/2001 2:33:19 PM)
 */
void initialize( );
/**
 * Pause the model.
 * Creation date: (10/4/2001 6:33:30 PM)
 */
void pause( );
/**
 * Reset the model to an initial state
 * Creation date: (10/4/2001 6:33:30 PM)
 */
void reset( );
/**
 * Run the model
 * Creation date: (10/4/2001 3:40:30 PM)
 */
void run( );
/**
 * Set the name of the model for display purposes.
 * Creation date: (12/3/2001 1:57:27 PM)
 * @param 1v_name java.lang.String
 */
void setName (String 1v_name);
/**
 * return the number of seconds between ticks in the model
 *
 * Creation date: (10/4/2001 3:45:29 PM)
 * @return int
 */
void setSleep(int 1v_sleep);
/**
 * Attaches the current view
 *
 * Creation date: (10/4/2001 3:40:30 PM)
 */
void setXimView(ViewInterface 1v_pane);
/**
 * Start the model
 * Creation date: (10/4/2001 6:33:30 PM)
 */
void start( );
/**
 * one step of the model. This stops the model if running and
 * then does a tick( )
 *
 * Creation date: (10/4/2001 6:33:30 PM)
 */
void step( );
/**
```

TABLE 1-continued

ModelInterface

```
* Stop the model
*
* Creation date: (10/4/2001 3:40:30 PM)
*/
void stop( );
/**
* This runs one tick of the simulation model
*
* Creation date: (10/4/2001 3:40:48 PM)
*/
void tick( );
}
```

TABLE 2

TapInterface

```
public interface TapInterface {
/**
* Insert the method's description here.
* Creation date: (10/11/2001 2:52:18 PM)
*/
void addChangeListener(ChangeListener 1v__1);
/**
* Insert the methods description here.
* Creation date: (12/5/2001 10:53:03 AM)
* @param 1v__tapValues java.lang.String[ ]
*/
void buildTap(String[ ] 1v__tapValues);
/**
* Decrement the arrays for editing purposes of an enumerated translator
*
* Creation date: (10/11/2001 2:52:18 PM)
*/
void enumerationDecrement( );
/**
* Increment tne arrays for editing purposes of an enumerated translator
*
* Creation date: (10/11/2001 2:52:18 PM)
*/
void enumerationIncrement( );
/**
* Used to help construct edit menu for initializing the translator object
* Creation date: (10/5/2001 2:02:53 PM)
* @return java.lang.Object
*/
Object[ ] getAttributeDefaults( );
/**
* Used to help construct edit menu for editing the translator object
* Creation date: (10/5/2001 2:02:53 PM)
* @return java.lang.Object
*/
String[ ] getAttributeNames( );
/**
* Gets the current "viewable" value for this translator.
* The icon that uses this translator can immediately use this
value in its presentation because it is of the
* correct type.
*
* Creation date: (10/19/2001 11:05:25 AM)
* @return java.lang.Object
*/
Object getCurrentValue( );
/**
* Insert the method's description here.
* Creation date: (10/17/2001 1:43:55 PM)
*/
ModelElement getElement( );
/**
* Insert the method's description here.
* Creation date: (10/17/2001 1:43:55 PM)
*/
ModelLibrary getLibrary( );
/**
```

TABLE 2-continued

TapInterface

```
* Return the mapped value which goes to the
model to get the value, transforms it
* and sets the current value to the newly updated value. After calling
getMappedValue
* the getCurrentValue method returns the updated value for presentation.
*
* Creation date: (10/5/2001 2:02:53 PM)
* @return java.lang.Object
*/
Object getMappedValue( );
/**
* Return the model associated with this translator.
* Creation date: (10/17/2001 1:43:55 PM)
*/
ModelInterface getModel( );
/**
* Returns the type information for the model element this
translator knows how to transform.
* Creation date: (10/5/2001 2:02:53 PM)
* @return java.lang.Object
*/
int getModelType( );
/**
* Return the untransformed model value for this translator.
* Creation date: (10/5/2001 2:02:53 PM)
* @return java.lang.Object
*/
Object getModelValue( );
/**
*translators may have multiple parameters that define
how they operate. This returns the
* parameter as an object for the parameter specified by the index.
(0 based index)
*
* Creation date: (10/5/2001 2:02:53 PM)
* @return java.lang.Object
*/
Object getParameter(Integer 1v__index);
/**
* During the editing of a tap,
the parameters are stored so they can be undone.
This
* method returns an array of Objects for all
the parameters that are being edited.
*
* Creation date: (10/5/2001 2:02:53 PM)
* @return java.lang.Object
*/
Object[ ] getParametersForEdit( );
/**
* Return the type information for the viewable attribute in an icon.
*
* Creation date: (10/5/2001 2:02:53 PM)
* @return java.lang.Object
*/
int getViewType( );
/**
* Return the xml for tnistranslatorin preparation for saving an icon to file.
*
* Creation date: (12/3/2001 1:32:52 PM)
* @return java.lang.String
*/
String getXML( );
/**
* Insert the method's description here.
* Creation date: (10/5/2001 4:47:08 PM)
* @return java.lang.Object
* @param 1v__value java.lang.Object
*/
void handleInput(MouseEvent 1v__event);
* Do any initialization that is necessary for the translator
* At least, validate that this translator is hooked
up to the proper model element and
* proper viewable icon attribute and then sync with
model by doing a getMappedValue
*
* Creation date: (10/11/2001 2:52:18 PM)
```

TABLE 2-continued

TapInterface

```
*/
void initialize( );
/**
* this method is used to determine if a translator
is of an enumerated type so
* the edit menu can put in add/remove buttons to increase or decrease the
* number of model/view states.
*
* Creation date: (1/8/2002 4:37:55 PM)
* @return boolean
*/
boolean isEnumerated( );
/**
* Map (transform) the model value to the viewable value.
* Creation date: (10/5/2001 4:47:08 PM)
* @return java.lang.Object
* @param 1v_value java.lang.Object
*/
Object mapValue (Object 1v_value);
/**
* Insert the method's description here.
* Creation date: (10/11/2001 2:52:18 PM)
*/
void removeChangeListener (ChangeListener 1v_1);
/**
* Set the current mapped value to the value of the argument
* Creation date: (10/5/2001 2:03:15 PM)
* @param iv_newValue java.lang.Object
*/
void setMappedValue (Object iv_newValue);
/**
* Insert the method's description here.
* Creation date: (10/5/2001 2:02:53 PM)
* @return java.lang.Object
*/
void setParameter(Integer 1v_parameterIndex,
Integer 1v_arrayIndex, Object 1v_value);
/**
* Insert the method's description here.
* Creation date: (10/5/2001 2:02:53 PM)
* @return java.lang.Object
*/
void setParameterForEdit(Integer 1v_parameterIndex,
Integer 1v_arrayIndex, Object 1v_value);
/**
* Insert the method's description here.
* Creation date: (10/5/2001 2:03:15 PM)
* @param 1v_newValue java.lang.Object
*/
void updateParametersForEdit( );
/**
* Validate to make sure thistranslatorconforms
to the requirements of the model element and
* viewable attribute.
*
* Creation date: (10/11/2001 2:52:18 PM)
*/
boolean validate( );
}
```

TABLE 3

IconInterface

```
public interface IconInterface {
/**
* Insert the method's description here.
* Creation date: (11/12/2001 3:30:49 PM)
* @return javax.swing.JPanel
*/
String describe( );
/**
* When editing an icon, this method will update the values of
thetranslators in an icon.
```

TABLE 3-continued

IconInterface

```
* Creation date: (11/12/2001 3:30:49 PM)
* @return javax.swing.JPanel
*/
void dialogApply( );
/**
* When editing an icon, if the user cancels the operation,
run any code necessary here.
* Creation date: (11/12/2001 3:30:49 PM)
* @return javax.swing.JPanel
*/
void dialogCancel( )
/**
* When editing an icon, if the user selects OK, update the values of the
* translators in an icon.
* Creation date: (11/12/2001 3:30:49 PM)
* @return javax.swing.JPanel
*/
void dialogOK( );
/**
* Insert the method's description here.
* Creation date: (11/12/2001 3:30:49 PM)
* @return javax.swing.JPanel
*/
IconEditDialog getEditDialog( );
/**
* Insert the method's description here.
* Creation date: (11/12/2001 3:30:49 PM)
* @return javax.swing.JPanel
*/
JPanel getEditDialogContentPane( );
/**
* Return the ModelLibrary for this icon
* Creation date: (10/15/2001 11:42:22 AM)
* @return com.ibm.adtech.xim.model.ModelInterface
*/
ModelLibrary getLibrary( );
/**
* Return the icon's name.
* Creation date: (11/30/2001 2:20:51 PM)
* @return java.lang.String
*/
String getName( );
/**
* Return the right click menu for this icon.
* Creation date: (10/15/2001 11:42:22 AM)
* @return com.ibm.adtech.xim.model.ModelInterface
*/
JPopupMenu getRightClickMenu( );
/**
* return the array of translator names eg, Color, Width, Position, so that
an
* editor will know how each translator will affect
the icon's visual behavior
*
* Creation date: (10/15/2001 11:42:22 AM)
* @return com.ibm.adtech.xim.icon.TapInterface
*/
String[ ] getTapNames( );
/**
* get the current parameter setting for this icon for the
* given translator index and parameter of that translator.
eg, a ColorIcon has a color tap
* and that translator has 6 parameters that can be set (start color,
end color, min, max etc)
*
* Creation date: (10/15/2001 11:42:22 AM)
* @return java.lang.Object
*/
Object getTapParameter(int 1v_tapIndex, int 1v_parameterIndex);
/**
* Return the array oftranslators for this icon
*
* Creation date: (10/15/2001 11:42:22 AM)
* @return com.ibm.adtech.xim.icon.TapInterface
*/
TapInterface[ ] getTaps( );
/**
* Return the view type for the index. The index is the internal number of
```

TABLE 3-continued

IconInterface

```
* the translator (0-based) for the possible multiple translators for this icon
*
* Creation date: (10/15/2001 11:42:22 AM)
* @return com.ibm.adtech.xim.model.ModelInterface
*/
public int getViewtype(int 1v_index);
/**
* Get the xml for saving to file.
* Creation date: (12/3/2001 1:14:42 PM)
* @return java.lang.String
*/
String getXML( );
* set the name based on the class and a unique id for that class
*
*/
void setDefaultName( );
/**
* Set the model Library for this icon
* Creation date: (10/15/2001 11:42:22 AM)
* @return com.ibm.adtech.xim.model.ModelInterface
*/
void setLibrary(ModelLibrary 1v_library);
/**
* Insert the method's description here.
* Creation date: (12/4/2001 11:25:45 AM)
* @param 1v_size java.lang.String
*/
void setLocation(Point 1v_location);
/**
* Insert the method's description here.
* Creation date: (12/4/2001 11:23:11 AM)
* @param 1v_name java.lang.String
*/
void setName(String 1v_name);
/**
* Method that will initialize parameters of an icon that is read in from file.
*
* Creation date: (1/3/2002 4:58:02 PM)
*/
void setParameter(Element 1v_parameter);
/**
* Insert the method's description here.
* Creation date: (12/4/2001 11:25:45 AN)
* @param 1v_size java.lang.String
*/
void setSize (Dimension 1v_size)
/**
* set thetranslators for this icon while editing, these can be undone if
* a cancel button is selected
*
* Creation date: (10/15/2001 11:42:22 AM)
* @return com.ibm.adtech.xim.icon.TapInterface
*/
void setTapEditParameter(Integer 1v_tapIndex,
                Integer 1v_parameterIndex,
                Integer 1v_arrayIndex,
                Object 1v_object);
/**
* set the translators for this icon
*
* Creation date: (10/15/2001 11:42:22 AM)
* @return com.ibm.adtech.xim.icon.TapInterface
*/
void setTapParameter(Integer 1v_tapIndex,
                Integer 1v_parameterIndex,
                Integer 1v_arrayIndex,
                Object 1v_object);
/**
* set the translators for this icon
*
* Creation date: (10/15/2001 11:42:22 AM)
* @return com.ibm.adtech.xim.icon.TapInterface
*/
void setTaps(TapInterface[ ] 1v_taps);
}
```

TABLE 4

Example Model

```
/**
* This is an example of a simple model implementation
*
* Creation date: (10/4/2001 4:54:54 PM)
* @author: Louis Weitzman
*/
public abstract class BasicModel implements ModelInterface, Runnable {
    // model admin stuff
    public int       iv_sleep = 1000;
    static public boolean iv_quit = false;       // to merge threads
                                                  when exiting
    static public boolean iv_run = false;         // to pause the model
    public ViewInterface iv_ximenv = null;
    public String    iv_name = "Xim Basic Model";  // display name;
/**
* BasicModel constructor comment.
*/
public BasicModel( ) {
    super( );
    System.out.print1n("Instantiating Xim Basic Model");
}
/**
* Insert the method's description here.
* Creation date: (10/4/2001 6:30:36 PM)
* @return int
*/
public String getName( ) {
    return iv_name;
}
/**
* Insert the method's description here.
* Creation date: (10/4/2001 6:30:36 PM)
* @return int
*/
public int getSleep( ) {
    return iv_sleep;
}
/**
* Initialize the model
* create a library
* Creation date: (10/5/2001 2:33:41 PM)
*/
public void initialize( ) {
    reset( );
}
/**
* Insert the method's description here.
* Creation date: (10/4/2001 6:32:46 PM)
*/
public void pause( ) {
    Boolean 1v_oldrun = new Boolean(iv_run);
    iv_run = false;
    iv_ximenv.propertyChange (new PropertyChangeEvent(this, "iv_run",
    1v_oldrun, new Boolean(iv_run)));
}
/**
* Insert the method's description here.
* Creation date: (10/4/2001 6:33:44 PM)
*/
public void reset( ) {
}
/**
* Insert the method's description here.
* Creation date: (10/4/2001 6:32:46 PM)
*/
public void run( ) {
    while (!iv_quit) {      // when quiting, let run method return
        try {
            if (iv_run) {   // if we're not paused, keep on ticking
                tick( );
            }
            Thread.sleep(getSleep( ));
        }
        catch (InterruptedException 1v_e) {
            1v_e.printStackTrace( );
```

TABLE 4-continued

Example Model

```
      }
   }
}
/**
* Insert the method's description here.
* Creation date: (12/3/2001 1:59:33 PM)
* @param 1v__name java.lang.String
*/
public void setName (String 1v__name) {
      iv__name = 1v__name;
}
/**
* Insert the method's description here.
* Creation date: (10/4/2001 6:30:36 PM)
* @return int
*/
public void setSleep(int 1v__sleep) {
      iv__sleep = 1v__sleep;
}
/**
* Insert the method's description here.
* Creation date: (10/4/2001 6:30:36 PM)
* @return int
*/
public void setXimView(viewInterface 1v__xim) {
      iv__ximenv = 1v__xim;
}
/**
* start up after a pause
* creation date: (10/4/2001 6:32:46 PM)
*/
public void start( ) {
      Boolean 1v__oldrun = new Boolean(iv__run);
      iv__run = true;
      iv__ximenv.propertyChange (new PropertyChangeEvent(this,
      "iv__run", 1v__oldrun,
new Boolean(iv__run)));
}
/**
* to go into stepping mode and do one tick
* Creation date: (10/4/2001 6:32:46 PM)
*/
public void step( ) {
      pause( );
      tick( );
}
/**
* used to sync threads when quitting
*
* Creation date: (10/412001 6:32:46 PM)
*/
public void stop( ) {
      iv__quit = true;
}
/**
* Insert the method's description here.
* model a goes from 10–20
* b goes from 1 . . .
* Creation date: (10/4/2001 6:29:12 PM)
*/
public void tick( ) {
}
/**
* Insert the method's description here.
* Creation date: (10/12/2001 2:30:48 PM)
* @return java.lang.String
*/
public String toString( ) {
      String 1v__running = (iv__run) ? "running" : "stopped";
      return iv__name + "[" + 1v__running + "]";
   }
}
```

TABLE 5

Example Translator

```
/**
* Thistranslatorwill map between continuous bounded
integer to a start and end color
* the currentValue is the color used in the display.
* the min and max values are specified in the DefaultBoundedRange-
Model
*
* Creation date: (10/5/2001 4:15:30 PM)
* @author: Louis Weitzman
*/
public class TapContinuousToColor extends
DefaultBoundedRangeModel implements
TapInterface {
protected Color          iv__startColor    = Color.blue;
protected Color          iv__endColor      = Color.green;
protected Color          iv__currentValue  = iv__startColor;
protected ModelLibrary   iv__library       = null;
protected ModelElement   iv__element       = null;
// the display name used for translator attribute
protected static String[ ] cv__attributeNames = {"Start color",
                                                 "End color",
                                                 "Value",
                                                 "Extent",
                                                 "Minimum",
                                                 "Maximum"};
// the default values used for creating this translator
protected static Object[ ] cv__attributeDefaults = {Color.red,
                                                    Color, green,
                                                    new Integer(0),
                                                    new Integer(1),
                                                    new Integer(0),
                                                    new Integer(10) };
// attributes saved while temporarily editing this translator when installed
on an icon
protected Object[ ] iv__attributesForEdit = {Color.red,
                                              Color, green,
                                              new Integer(0),
                                              new Integer(1),
                                              new Integer(0),
                                              new Integer(l0) };
/**
* TapContinuousToColor constructor comment.
* value, extent, min, max
*/
public TapContinuousToColor (ModelLibrary 1v__library,
ModelElement 1v__element) {
super(0, 0, 0, 10);
1v__library       = 1v__library;
iv__element       = 1v__element;
initialize( );
//System.out.println("TapContinuousToColor constructor 1");
}
/**
* TapContinuousToColor constructor comment.
* @param value int
* @param extent int
* @param min int
* @param max int
*/
public TapContinuousToColor (ModelLibrary 1v__library,
               ModelElement       1v__element,
               Color              1v__startColor,
               Color              1v__endColor,
               Integer            1v__value,
               Integer            1v__extent,
               Integer            1v__min,
               Integer            1v__max) {
super(1v__value.intValue( ), 1v__extent.intValue( ), 1v__min.intValue( ),
1v__max.intValue( ));
iv__startColor    = 1v__startColor;
iv__endColor      = 1v__endColor;
iv__library       = 1v__library;
iv__element       = 1v__element;
initialize ( )
//System.out.println("TapContinuousToColor constructor 3");
}
/**
```

TABLE 5-continued

Example Translator

```
* TapContinuousToColor constructor comment.
* @param value int
* @param extent int
* @param min int
* @param max int
*/
public TapContinuousToColor (ModelLibrary 1v_library,
                ModelElement    1v_element,
                Integer         1v_value,
                Integer         1v_extent,
                Integer         1v_min,
                Integer         1v_max) {
super(1v_value.intValue( ), 1v_extent.intValue( ), 1v_min.intValue( ),
1v_max.intValue( ));
iv_library    = 1v_library;
iv_element    = 1v_element;
initialize( );
//System.out.println("TapContinuousToColor2 constructor with min=" +
1v_min + "max=" + 1v_max);
}
/**
* the xmltranslatorlooks like this
* <tap class="com.ibm.adtech.xim.icon.TapContinuousToColor">
* <library name="Xim Env"/>
* <element name="iv_a"/>
* <arg name="startColor"value="–16776961"/>
* <arg name="endColor"value="–16711936"/>
* <arg name="value" value="0"/>
* <arg name="extent" value="1"/>
* <arg name="minimum" value="0"/>
* <arg name="maximum" value="10"/>
* </tap>
*
*
* Creation date: (12/5/2001 11:26:51 AM)
* @param 1v_args java.lang.String[ ]
*/
public void buildTap(String[ ]1v_args) {
int 1v_startColor = Integer.parseInt(1v_args[1]);
int 1v_endColor = Integer.parseInt(1v_args[3]);
iv_startColor = new Color(1v_startColor);
iv_endColor = new Color(1v_endColor);
setValue(Integer.parseInt (1v_args [5]));
setExtent(Integer.parseInt (1v_args [7]));
setMinimum(Integer.parseInt (1v_args [9]));
setMaximum(Integer.parseInt (1v_args [11]));
initialize( );
}
/**
* Insert the method's description here.
* Creation date: (1/6/2002 2:44:37 PM)
*/
public void enumerationDecrement( ) { }
/**
* Insert the method's description here.
* Creation date: (1/6/2002 2:44:37 PM)
*/
public void enumerationIncrement( ) { }
/**
* Insert the method's description here.
* Creation date: (11/1/2001 10:48:18 AM)
*/
public Object[ ]getAttributeDefaults( ) {
return getAttributeDefaultsInternal( );
}
/**
* Insert the method's description here.
* Creation date: (11/1/2001 10:48:18 AM)
public static Object[ ] getAttributeDefaultsInternal( ) {
return cv_attributeDefaults;
}
/**
* Insert the method's description here.
* Creation date: (11/1/2001 10:48:18 AM)
*/
public String[ ] getAttributeNames( ) {
return getAttributeNamesInternal( );
}
/**
* Insert the method's description here.
* Creation date: (11/1/2001 10:48:18 AM)
*/
public static String[ ] getAttributeNamesInternal( ) {
return cv_attributeNames;
}
/**
* Insert the method's description here.
* Creation date: (10/19/2001 11:12:04 AM)
* @return java.lang.Object
*/
public Object getCurrentValue( ) {
return 1v_currentValue;
}
/**
* Insert the method's description here.
* Creation date: (10/17/200: 1:48:09 PM)
* @return com.ibm.adtech.xim.model.ModelInterface
*/
public ModelElement getElement( ) {
return iv_element;
}
/**
* Insert the method's description here.
* Creation date: (10/17/2001 1:48:09 PM)
* @return com.ibm.adtech.xim.model.ModelInterface
*/
public ModelLibrary getLibrary( ) {
return 1v_library;
}
/**
* get the value from the model and then map it.
* save it on the iv_currentValue and return the new mapped value
*
* Creation date: (10/5/2001 1:59:37 PM)
* @return int
*/
public Object getMappedValue( ) {
Integer 1v_value = (Integer)getModelValue( );
iv_currentValue = (Color)mapValue(1v_value);
return iv_currentValue;
}
/**
* Insert the method's description here.
* Creation date: (10/17/2001 1:48:09 PM)
* @return com.ibm.adtech.xim.model.ModelInterface
*/
public ModelInterface getModel( ) {
return iv_library.getModel( );
}
/**
* Insert the method's description here.
* Creation date: (10/30/2001 4:57:06 PM)
* @return int
*/
public int getModelType( ) {
return getModelTypeInternal( );
}
/**
* Insert the method's description here.
* Creation date: (10/30/2001 4:57:06 PM)
* @return int
*/
public static int getModelTypeInternal( ) {
return ModelLibrary.cv_TYPE_INTEGER;
}
/**
* Insert the method's description here.
* Creation date: (10/5/2001 1:59:37 PM)
* @return int
*/
public Object getModelValue( ) {
If (iv_element == null) {
return new Integer(getMinimum( )); // If null iv_element,translatoris
static
```

TABLE 5-continued

Example Translator

```
        }
      else {      // get value from iv_object
        return (Object)iv_element.getModelValue( );
      }
}
/**
*
* Creation date: (10/5/2001 1:59:55 PM)
* @param 1v_newValue int
*/
public Object getParameter(Integer 1v_index) {
switch (1v_index.intValue( )) {
    case 0:
      return iv_startColor;
    case 1:
      return iv_endColor;
    case 2:
      return new Integer(getValue( ));
    case 3:
      return new Integer(getExtent( ));
    case 4:
      return new Integer(getMinimum( ));
    case 5:
      return new Integer(getMaximum( ));
}
System.out.println("TapContinuousToColor.getParameter:
Invalid parameter index
(" + 1v_index + ") for " + this);
return null;
}
/**
* return the parameters saved up during the editing process
*
* Creation date: (11/21/2001 3:24:02 PM)
* @return java.lang.Object[ ]
*/
public Object[ ] getParametersForEdit( ) {
    iv_attributesForEdit[0] = iv_startColor;
    iv_attributesForEdit[1] = iv_endColor;
    iv_attributesForEdit[2] = new Integer(getValue( ));
    iv_attributesForEdit[3] = new Integer(getExtent( ));
    iv_attributesForEdit[4] = new Integer(getMinimum( ));
    iv_attributesForEdit[5] = new Integer(getMaximum( ));
    return iv_attributesForEdit;
}
/**
* Insert the method's description here.
* Creation date: (10/30/2001 4:57:06 PM)
* @return int
*/
public int getViewType( ) {
return getViewTypeInternal( );
}
/**
* Insert the method's description here.
* Creation date: (10/30/2001 4:57:06 PM)
* @return int
*/
public static int getViewTypeInternal( ) {
return ModelLibrary.cv_TYPE_COLOR;
}
/**
* Create the xml that will enable to recreate thistranslatorusing the most
descriptive
* constructor. eg, Color, Color, Integer, Integer, Integer, Integer.
* <tap class="com.ibm.adtech.xim.icon.TapContinuousToColor">
* <arg class="java.awt.Color">
* <value value="255" type="java.lang.Integer"/>
* <value value="255" type="java.lang.Integer"/>
* <value value="255" type="java.lang.Integer"/>
* </arg>
* . . .
* </tap>
*
* Creation date: (12/3/2001 1:35:23 PM)
* @return java.lang.String
*/
```

TABLE 5-continued

Example Translator

```
public String getXML( ) {
int 1v_startRGB = iv_startColor.getRGB( );
int 1v_endRGB = iv_endColor.getRGB( );
int 1v_extent = getExtent( );
int 1v_min = getMinimum( );
int 1v_max = getMaximum( );
String 1v_xml = "<tap class=\""+ getClass( ).getName( ) + "\">\n";
1v_xml = 1v_xml + "<library name=\""+ iv_library.getName( ) +
"\"/>\n";
1v_xml = 1v_xml + <element name=\""+ iv_element.getVariable( ) +
"\"/>\n";
1v_xml = 1v_xml + "<arg name=\"startColor\" value=\"" +
1v_startRGB +
"\"/>\n";
1v_xml = 1v_xml + "<arg name=\"endColor\" value=\"" +
1v_endRGB +
"\"/>\n";
1v_xml = 1v_xml + "<arg name=\"value\" value=\"" + 1v_min +
"\"/>\n";
1v_xml = 1v_xml + "<arg name=\"extent[|]l' value=\"" + 1v_extent +
"\"/>\n";
1v_xml = 1v_xml + "<arg name=\"minimum\" value=\"" + 1v_min +
"\"/>\n";
1v_xml = 1v_xml + "<arg name=\"maximum\" value=\"" + 1v_max +
"\"/>\n";
1v_xml = 1v_xml + "</tap>\n";
return 1v_xml;
}
/**
* Insert the method's description here.
* Creation date: (10/31/2001 9:19:43 AM)
*/
public void handleInput(MouseEvent 1v_event) {
}
/**
* Insert the method's description here.
* Creation date: (10/31/2001 3:42:53 PM)
*/
public void initialize( ) {
    if (validated( )) {
      if (iv_element != null) {
        iv_element.setTap(this);
      }
      getMappedValue( );
    }
    else{
System.out.println("Error: Invalid element ("+ iv_element +")
fortranslator" + this +")");
    }
}
/**
* Insert the method's description here.
* Creation date: (1/6/2002 4:38:16 PM)
* @return boolean
*/
public boolean isEnumerated( ) {
return false;
}
/**
* map the integer argument to a color in the range of
startColor to endColor
*
* Creation date: (10/5/2001 4:46:31 PM)
* @return java.lang.Object
* @param 1v_value int
*/
public Object mapValue(Object 1v_value) {
    int 1v_r, 1v_g, 1v_b;
    double 1v_fromLo, 1v_toLo, 1v_fromHi, 1v_toHi, 1v_v;
    int 1v_val = ((Integer)1v_value).intValue( );
    // map this integer to a color
    setValue(1v_val);
    1v_v = (double)getValue( );                 // constrain to
    1v_fromLo = getMinimum( );                  bounded range
    1v_toLo = getMaximum( );
    // Red
    1v_fromHi = iv_startColor.getRed( );
```

TABLE 5-continued

Example Translator

```
        1v_toHi = iv endColor.getRed( );
        1v_r = (int)Utils.transformCoordinate(1v_fromLo,
                                              1v_toLo,
                                              1v_fromHi,
                                              1v_toHi,
                                              1v_v);
     // Green
        1v_fromHi = iv_startColor.getGreen( );
        1v_toHi = iv_endColor.getGreen( );
        1v_g = (int)Utils.transformCoordinate(1v_fromLo,
                                              1v_toLo,
                                              1v_fromHi,
                                              1v_toHi,
                                              1v_v);
     // Blue
        1v_fromHi = 1v_startColor.getBlue( );
        1v_toHi = iv_endColor.getBlue( );
        1v_b = (int)Utils.transformCoordinate(1v_fromLo,
                                              1v_toLo,
                                              1v_fromHi,
                                              1v_toHi,
                                              1v_v);
        return new Color(1v_r, 1v_g, 1v_b);
}
/**
 * given the name of the variable and the class it lives in
 * set its value to the 1v_newValue
 *
 * Creation date: (10/5/2001 1:59:55 PM)
 * @param 1v_newValue int
 */
public void setMappedValue(Object 1v_newValue) {
    if (iv_element == null) {
        return;
    }
    try {
        ModelInterface 1v_model = getModel( );
        Class 1v_class = 1v_model.getClass( );
        Field 1v_field = 1v_class.getField(iv_element.getVariable( ));
        1v_field.set(1v_model, 1v_newValue);
        getMappedValue( );
        System.out.println("setMappedValue: " + this);
    }
    catch (NoSuchFieldException 1v_e) {
        System.out.println("setValue: No such field exception, " +
iv_element.getVariable( ));
    }
    catch (IllegalAccessException 1v_e2) {
System.out.println("setValue: Illegal Access exception," +
1v_newValue);
    }
}
/**
 * Parameters are the setup values for thistranslatorto work.
 * Given the index of a parameter of this tap, set the parameter
to the new object
 * ignore array index cus we don't store 2 levels of array values
 *
 * Creation date: (10/21/2001 10:00 AM)
 * @param 1v_index int
 * @param 1v_value Object
 */
public void setParameter
(Integer 1v_index, Integer 1v_arrayIndex, Object 1v_value) {
    int 1v_i = 1v_index.intValue( );
    if ((0 <= 1v_i) &&
    (1v_i < 6)) {
    switch (1v_i) {
    case 0:
        iv_startColor = (Color)1v_value;
        break;
    case 1:
        iv_endColor = (Color)1v_value;
        break;
    case 2:
        setValue(((Integer) 1v_value).intValue( ));
        break;
    case 3:
        setExtent(((Integer)1v_value).intValue( ));
        break;
    case 4:
        setMinimum(((Integer)1v_value).intValue( ));
        break;
    case 5:
        setMaximum(((Integer)1v_value).intValue( ));
        break;
    }
    getMappedValue( );         // update the translators
current value
    }
    else {
System.out.println("TapContinuousToColor.setParameter: Invalid index ("
+ 1v_index + ") for " + this);
    }
}
/**
 * Parameters are the setup values for thistranslatorto work.
 * Given the index of a parameter of this tap,
the cached value for this index.
 * this is used wnen the icon is being edited
 * Creation date: (10/21/2001 10:00 AM)
 * @param 1v_index int
 * @param 1v_value Object
 */
public void setParameterForEdit
(Integer 1v_index, Integer 1v_arrayIndex, Object
1v_value) {
    int 1v_i = 1v_index.intValue( );
    if ((0 <= 1v_i) &&
    (1v_i < 6)) {
        iv_attributesForEdit[1v_i] = 1v_value;
    }
    else {
System.out.println("TapContinuousToColor.SetParameterForEdit: Invalid
index ("+1v_index + ") for" + this);
    }
}
/**
 * Insert the method's description here.
 * Creation date: (10/11/2001 5:37:29 PM)
 * @return java.lang.String
 */
public String toString( ) {
    String 1v_static = (iv_element == null)?"(static)": " ";
    int 1v_r = iv_currentValue.getRed( );
    int 1v_g = iv_currentValue.getGreen( );
    int 1v_b = iv_currentValue.getBlue( );
return "TapContinuousToColor[" +
1v_static + "color:" + 1v_r + ":" + 1v_g + ":"
+ 1v_b + "]";
}
/**
 * Update the parameters from toe edited values stored on the iv
iv_attributesForEdit
 *
 * Creation date: (10/21/2001 10:00 AM)
 * @param 1v_index int
 * @param 1v_value Object
 */
public void updateParametersForEdit( ) {
    iv_startColor = (Color)iv_attributesForEdit[0];
    iv_endColor = (Color)iv_attributesForEdit[1];
    setValue(((Integer)iv_attributesForEdit[2]).intValue( )); // value
    secExtent(((Integer)iv_attributesForEdit[3]).intValue( )); // extent
    setMinimum(((Integer)iv_attributesForEdit[4]).intValue( )); // min
    setMaximum(((Integer)iv_attributesForEdit[5]).intValue( )); // max
}
/**
 * Insert the method's description here.
 * Creation date: (11/1/2001 10:48:18 AM)
 */
public boolean validate( ) {
    if ((iv_element == null) ||
    (getModelTypeInternal( ) == iv_element.getModelType( ))) {
```

TABLE 5-continued

Example Translator

```
        return true;
      }
      else {
        return false;
      }
    }
}
```

TABLE 6

Example Icon

```
/**
 * Bar icon.
 * Creation date: (10/11/2001 4:29:08 PM)
 * @author: Louis Weitzman
 */
public class BarIcon extends BaseIcon {
    public      static Color   cv_defaultColor = Color.blue;
    protected   int            iv_orientation =
    Base Icon.cv_ORIENTATION_HORIZONTAL;
    protected   int            iv_borderWidth = 1;
    protected   JRadioButton   iv_horizontalRadioButton =
                               null; /* toggle
button in edit menu to indicate horizontal or vertical layout */
    protected   JRadioButton   iv_verticalRadioButton =
                               null; /* vertical */
    protected   JRadioButton   iv_centerRadioButton =
                               null; /* center */
/**
 * ColorComponent constructor comment.
 * connect the element to the component created
 */
public BarIcon (ModelLibrary 1v_library, TapInterface 1v_tap) {
    super( );
    initializeTaps(new TapContinuousToColor(1v_library, null),
    1v_tap);
    initialize(1v_library);
}
/**
 * Insert the method's description here.
 * Creation date: (1/3/2002 12:03:10 PM)
 */
public BarIcon (ModelLibrary 1v_library, TapInterface 1v_colorTap,
TapInterface 1v_sizeTap) {
    super( );
    initializeTaps(1v_colorTap, 1v_sizeTap);
    initialize(1v_library);
}
/**
 * ContinuousColorComponent constructor comment.
 * connect the element to the component created
 */
public BarIcon (ModelLibrary 1v_library, ModelElement 1v_element) {
    super( );
    initializeTaps(new TapContinuousToColor(1v_library, 1v_element),
    new TapContinuousToInteger (1v_library, 1v_element));
    initialize (1v_library);
}
/**
 * enable the setting of the Horizontal boolean setting
 *
 * Creation date: (1/3/2002 5:33:23 PM)
 * @return javax.swing.JPanel
 */
public JPanel getEditDialogContentPaneAux( ) {
JPanel 1v_panel = new JPanel( );
JPanel 1v_row = new JPanel( );
1vpanel.setLayout(new BoxLayout(1v_panel, BoxLayout.Y_AXIS));
1v_row.setLayout(new BorderLayout( ));
EtchedBorder 1v_border = new EtchedBorder( );
JLabel 1v_label = new JLabel("Orientation", SwingConstants.LEFT);
1v_label.setPreferredSize
(new Dimension(IconEditDialog.cv_labelWidth,
```

TABLE 6-continued

Example Icon

```
IconEditDialog.cv_labelHeight));
1v_label.setFont(IconEditDialog.cv_labelFont);
int iv_orienatation = getOrientation( );
boolean 1v_hor =
(1v_orienatation == BaseIcon.cv_ORIENTATION_HORIZONTAL) ?
true : false;
boolean 1v_ver =
(1v_orienatation == BaseIcon.cv_ORIENTATION_VERTICAL) ?
true : false;
boolean 1v_cen =
(1v_orienatation == BaseIcon.cv_ORIENTATION_CENTER) ?
true : false;
iv_horizontalRadioButton = new JRadioButton("Horizontal", 1v_hor);
iv_verticalRadioButton = new JRadioButton("Vertical", 1v_ver);
iv_centerRadioButton = new JRadioButton("Center", 1v_cen);
ButtonGroup 1v_group = new ButtonGroup( );
1v_group.add(iv_horizontalRadioButton);
1v_group.add(iv_verticalRadioButton);
1v_group.add(iv_centerRadioButton);
JPanel 1v_groupPanel = new JPanel( );
1v_groupPanel.setLayout
(new BoxLayout(1v_groupPanel, BoxLayout.X_AXIS));
1v_groupPanel.add(iv_horizontaiRadioButton);
1v_groupPanel.add(iv_verticalRadioButton);
1v_groupPanel.add(iv_centerRadioButton);
1v_panel.setBorder(new TitledBorder(1v_border,
                                    "Icon Parameters",
                                    TitledBorder.LEFT,
                                    TitledBorder.TOP,
                                    IconEditDialog.cv_labelFont,
                                    Color.black));
    1v_row.add(1v_label, BorderLayout.WEST);
    1v_row.add(1v_groupPanel, BorderLayout.CENTER);
    1v_panel.add(1v_row);
    return 1v_panel;
}
/**
 * if true, draw the bar horizontally, else draw it as a column
 * return this state
 *
 * Creation date: (01/03/2002 12:31:21 PM)
public int getOrientation( ) {
return iv_orientation;
}
/**
 * Insert the method's description here.
 * Creation date: (10/11/2001 4:51:03 PM)
 * @return java.lang.String
 */
public String getUIClassD( ) {
return "BarUI";
}
/**
 * Insert the method's description here.
 * Creation date: (11/5/2001 5:08:55 PM)
 */
public int getViewType(int 1v_index) {
    if (1v_index == 0) {
        return ModelLibrary.cV_TYPE_COLOR;
    }
    else if (1v_index ==1) {
        return ModelLibrary.cv_TYPE_INTEGER;
    }
    else {
        return −1;
    }
}
/**
 * Insert the method's description here.
 * Creation date: (11/30/2001 2:22:18 PM)
 * @return java.lang.String
 */
public String getXMLAux( ) {
String 1v_xml = "<parameter name=\"orientation\"value=\""+
getOrientation( ) + "\"/>\n";
return 1v_xml;
}
```

TABLE 6-continued

Example Icon

```
/**
 * Insert the method's description here.
 * Creation date: (11/26/2001 5:36:44 PM)
 * @param 1v_tap com.ibm.adtech.xim.icon.TapInterface
 */
public void initializeTaps(TapInterface 1v_tap0, TapInterface 1v_tap1) {
setBorder (new LineBorder(Color.black, iv_borderWidth));
iv_taps = new TapInterface[2];
iv_taps[0] = 1v_tap0;
iv_taps[1] = 1v_tap1;
iv_tapNames = new String[2];
iv_tapNames[0] = "Color";
iv_tapNames[1] = "Size";
// setup view type info
iv_viewTypes = new int[2];
iv_viewTypes[0] = ModelLibrary.cv TYPE_COLOR;
iv_viewTypes[1] = ModelLibrary.cv_TYPE_INTEGER;
// setup edit dialog widgets
iv_elementCombo        = new JComboBox[2];
iv_tapCombo            = new JComboBox[2];
iv_tapAttributePanels  = new JPanel[2];
}
/**
 * if true, draw the bar horizontally, else draw it as a column
 *
 * Creation date: (01/03/2002 12:31:21 PM)
 */
public boolean isOrientationHorizontal( ) {
if (getOrientation( ) BaseIcon.cv_ORIENTATION_HORIZONTAL) {
return true;
}
else {
    return false;
\}
}
public boolean isOrientationVertical( ) {
if (getOrientation( ) == BaseIcon.cv_ORIENTATION_VERTICAL) {
return true;
}
else {
    return false;
\}
}
public boolean isOrientationCenter( ) {
if (getOrientation( ) == BaseIcon.cv_ORIENTATION_CENTER) {
return true;
}
else {
    return false;
\}
}
/**
 * this componente is always opaque;
 *
 * Creation date: (10/11/2001 5:31:21 PM)
 */
public boolean isOpaque( ) {
    return false;
}
/**
 * if true, draw the bar horizontally, else draw it as a column
 *
 * Creation date: (01/03/2002 12:31:21 PM)
 */
public void setOrientation(int 1v_o) {
iv_orientation = 1v_o;
}
/**
 * this method overrides the default (which does nothing) to initialize
 * the parameter for orientation for this icon.
 * its called when read in from file.
 * The parameter is of the form
 * <parameter name="horizontal"value="true"/>
 *
 *
 * Creation date: (1/3/2002 4:58:42 PM)
 */
public void setParameter(Element 1v_parameter) {
```

TABLE 6-continued

Example Icon

```
String 1v_name = 1v_parameter.getAttribute("name");
String 1v_value = 1v_parameter.getAttribute("value");
if (Iv_name.equals("orientation")) {
setOrientation(Integer.parseInt(1v_value));
}
else {
System.out.println("BarIcon.SetParameter: Don't know how to set parameter'" +
       1v_name + "'with value'" + 1v_value + "'");
    }
}
/**
 * Insert the method's description here.
 * Creation date: (10/11/2001 4:43:06 PM)
 * @param 1v_ui com.ibm.adtech.xim.icon.ContinuousColorUI
 */
public void setUI(BarUI 1v_ui) {
super.setUI(1v_ui);
}
/**
 * Here we grab the users edited value for iv_horizontal and set it.
 *
 * Creation date: (1/4/2002 1:43:06 PM)
 */
public void updateParametersForIcon( ) {
if (iv_horizontalRadioButton != null) {
boolean 1v_hor = iv_horizontalRadioButton.isSelected( );
boolean 1v_ver = iv_verticalRadioButton.isSelected( );
boolean 1v_cen = iv_centerRadioButton.isSelected( );
if(iv_hor) {
setOrientation(BaseIcon.cv_ORIENTATION_HORIZONTAL);
}
else if (1v_ver) {
setOrientation(BaseIcon.cv_ORIENTATION_VERTICAL);
}
else if (iv_cen) {
setOrientation(BaeeIcon.cv_ORIENTATION_CENTER);
}
else {
System.out.println("BarIcon.updateParametersForIcon: *** Unknown orientation selected");
        }
    }
}
/**
 * Insert the method's description here.
 * Creation date: (10/11/2001 4:43:37 PM)
 * @param 1v_ui com.ibm.adtech.xim.icon.ContinousColorUI
 */
public void updateUI( ) {
    setUI((BarUI)UIManager.getUI(this));
    invalidate( );
}
}
```

The MVCT Architecture Applied to Grid Resource Visualization:

Grid computing is a system of computers and computer resources that can cooperate in a Grid network. The computers and resources may be heterogeneous whereby the individual computer and resource may be of different architecture, capability and even ownership. The Grid network supports P2P networking whereby individual nodes communicate directly rather than through a separate server (as in the world wide web type of network). In Grid computing, it is possible that a large number of computers and resources may cooperate as a Grid Group. Such a group could easily comprise a million computers. In operation, computers and resources may independently join and leave the Grid. In order to provide human comprehension of various aspects of the Grid or Grid Group, a technique is proposed using MVCT architecture to efficiently present the various views that provide conceptual and actual knowledge of the status of the Grid.

There are a number of different aspects of using the Model-View-Controller with Transformation architecture (MVCT) that facilitate visualization of Grid computing infrastructure. When speaking of the Grid model, we are referring to the underlying data representation that represents the current state of the grid and it's components. This model could be directly tied to the grid data sources themselves but in the preferred embodiment, it is more efficient to cache the grid status data locally. Each grid computer transmits "status advertisements" to the members of the grid. The status advertisement describes the computer hardware, operating system, resources and the like as well as a snapshot of function and performance information including predetermined threshold exceptions. Thresholds are set for instance to identify when a CPU is idle for an excessive amount of time. The advertisements are generated when a grid computer (peer) joins or leaves the grid, when a threshold is detected, at predetermined time intervals and on special predetermined events (such as a hardware fault). The MVCT visualization program models the data and presents the views to display the status of the grid and its components. Various aggregation and additional attributes are generated from this status data.

In one embodiment, the primary display and views are displayed wherein the views represent certain status such as resource availability. A selectable icon on the primary display permits the same display to present views that represent performance status. The selectable icon provides a user accessible to display the same map with multiple versions of the views wherein the views represent different aspects of status for each version.

In another embodiment, the primary display and views represent the general grid. A grid group is identified that is restricted to a portion of the grid. By selecting the grid group of interest, the primary display views are modified to show the status of the grid group relative to the overall grid. This is done by providing a bar graph view for each aggregate view where the bar graph shows the requested status of the grid separately from the status of the same aggregate view for the grid group. For example, a bar is red for the bottom two thirds of the bar but green for the top third. This tells the human user that the aggregate resource utilization supporting the whole grid is over utilized (Red) and represents two thirds of the capability while the grid group utilization is satisfactory (green) and represents one third of the capability.

A very wide range of status information is displayed using the present invention. In one embodiment, each peer is required to supply predefined information in a predefined format. Status information includes static information such as hardware and software resource including name, amount, model, version and the like. This includes resources such as processor, i/o, peripherals, memory, performance (speed), cache size, operating system, applications and API's. Dynamic information includes instantaneous snapshots, time averaged and threshold events. Dynamic information includes processor and i/o utilization, response time, error rate, Network performance, application run time, queue activity, availability information and the like.

The following are a few useful examples of Grid Visualization using this architecture to represent a Grid model. (Here, views=icons and diagrams=collections of views)

General vs. Specific (Hierarchy)

One of the most interesting aspects of the architecture is the separation of model from view and this provides a great flexibility. This is particularly useful when trying to display the Grid status at various degrees of resolution. Its important to get an overall status of the environment, while being able to "drill" down to very specific details of the grid at other times.

Figure 9:
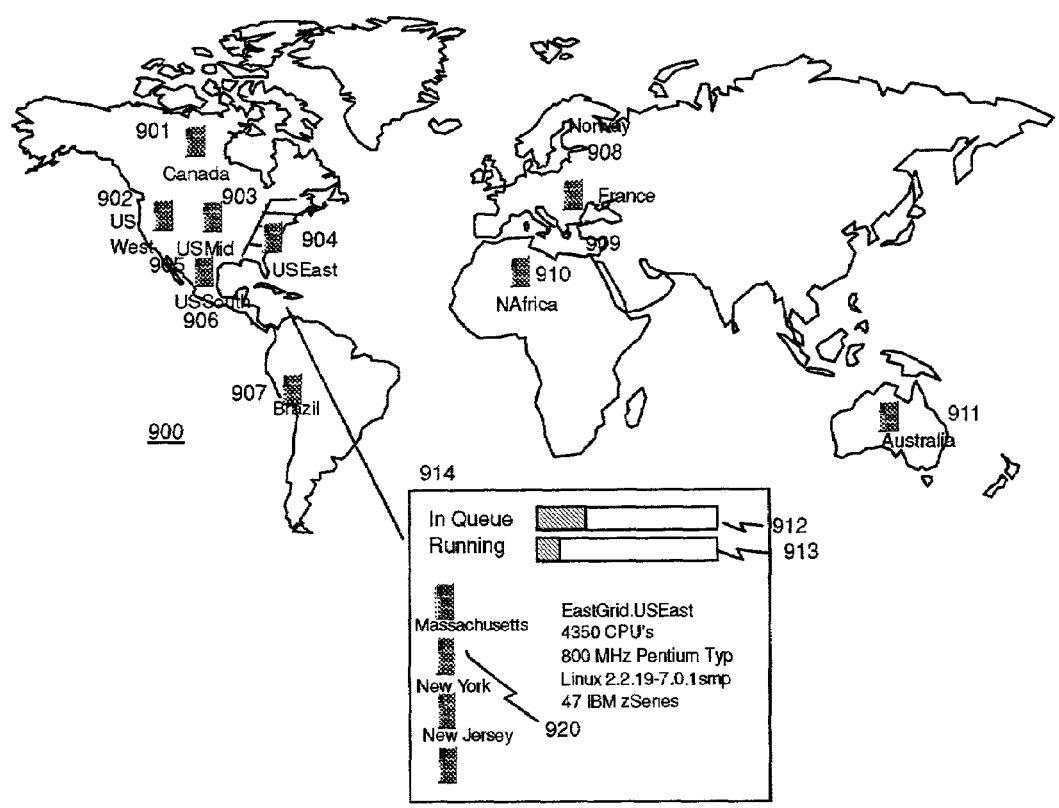
FIG. 9 is an example of geographical Grid visualization of the present invention.

Referring to FIG. 9, Grid components are aggregated geographically. The Grid components in the United States Midwest (USMid) 903 are represented by an icon of a computer box. Similar icons are used at other geographic locations such as France 909. Each of these icons are color coded to represent the aggregated performance. The USMid icon 903 is green indicating that it is fully utilized while the USEast icon 904 is blue indicating it is lightly loaded. USSouth icon 906 is blinking indicating an anomaly such as resources below a predefined threshold are available to the Grid or that significant communications backup exists. The blinking state indicates an anomaly that needs human attention.

In order for a human user to learn more about the grid, he can drill down for more detail. In the preferred embodiment, the user selects the USEast icon 904 by use of a mouse controlled cursor icon. The selection results in a detail box 914 being displayed. Icons 912 and 913 are provided to show a graphical representation of the facilities available in that region of the Grid. Icons representing sub areas in the region USEast are shown as computer boxes for the states in the region. Icon 920 represents New York state. Text is also provided to describe the status of the aggregate in the region. Other types of icons can be utilized as appropriate to further depict the aggregate resource of the region.

Figure 10:
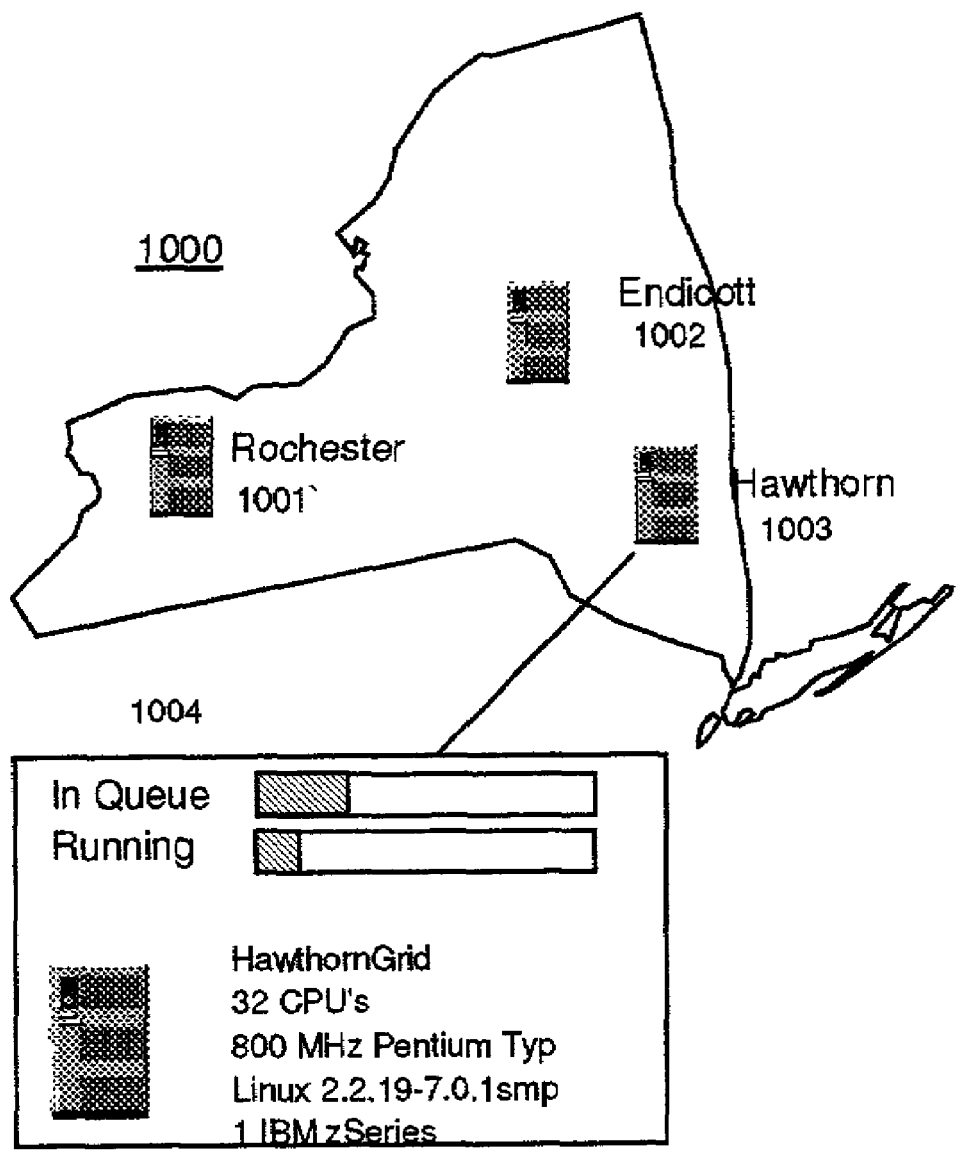
FIG. 10 is an example of a first detail of a Grid Visualization.
Figure 11:
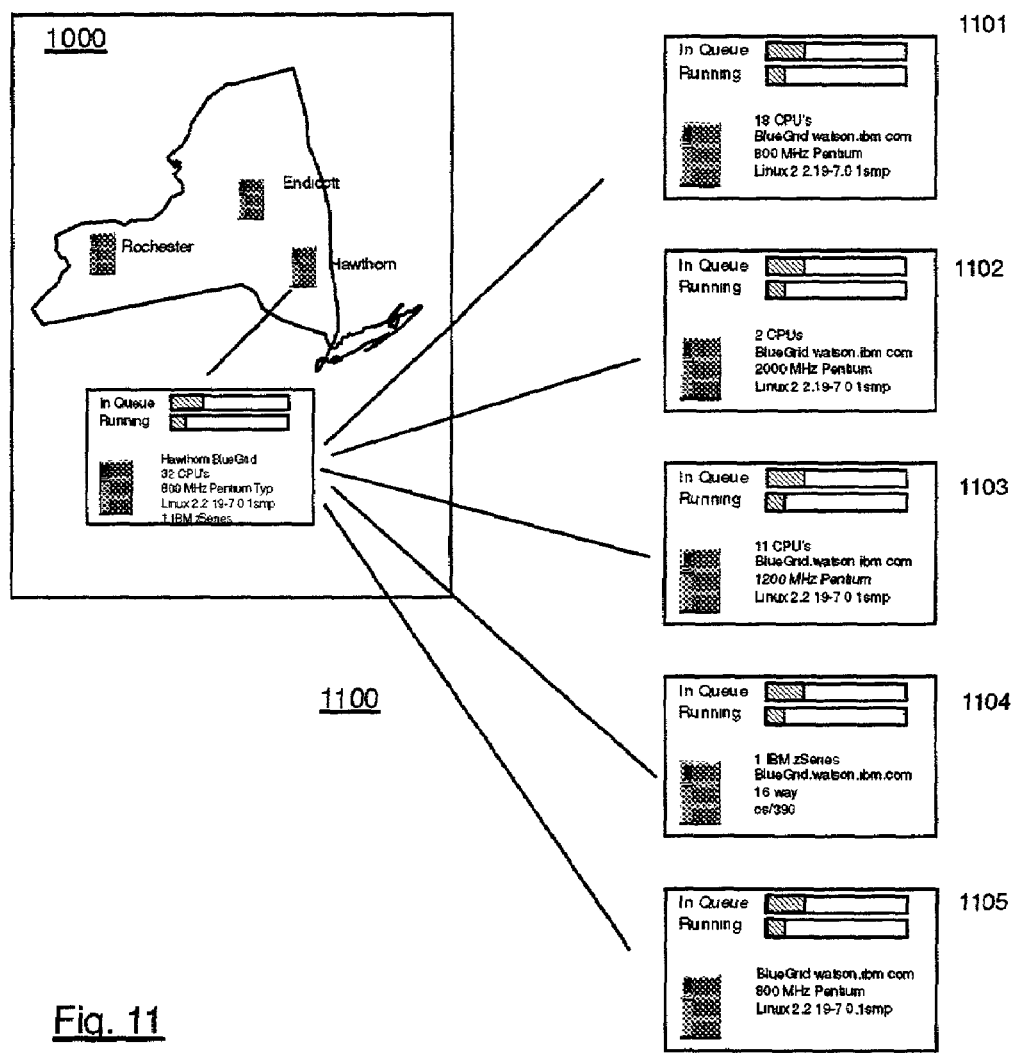
FIG. 11 is an example of a second detail of a Grid Visualization.

Next the human user uses his mouse controlled cursor to select an icon representing a computer box (New York) 920 within the detail box 914. This results in the display shown in FIG. 10. A map of the New York State is shown with Grid aggregates at Rochester 1001, Endicott 1002 and Hawthorne 1003 represented by computer box icons. The human user selects the Hawthorn aggregate and is presented with detailed information in a graphical box 1004. Various icons are provided in box 1004 to provide aggregate information. The human user then selects the computer box icon within the box 1004 for more detail. This results in a set of new detail boxes with a finer breakdown of the status of the Grid computers and services available in the Hawthorn aggregate. This time boxes 1101–1105 represent status according to computer type rather than a geographical breakdown.

Figure 12:
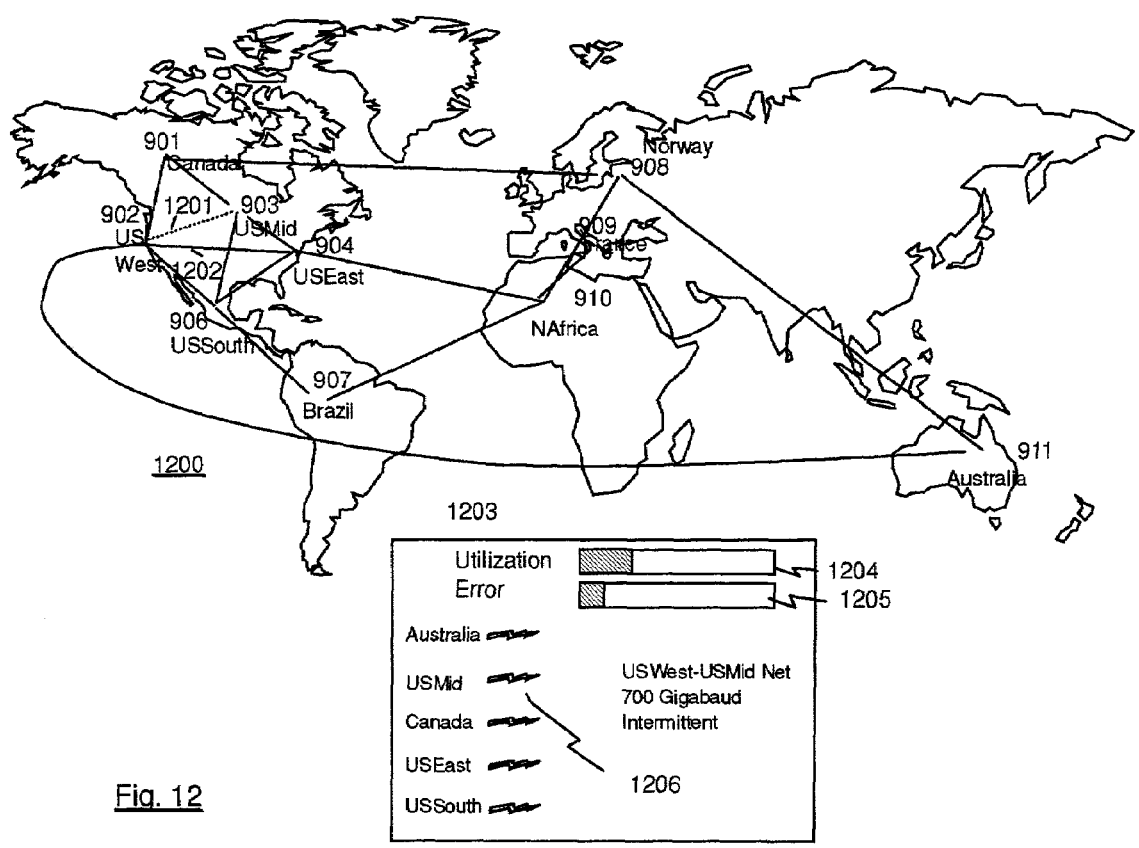
FIG. 12 is an example of a geographical Grid network visualization.

FIG. 12 is another embodiment of the present invention whereby the MVCT architecture provides visualization of the communications network between geographical aggregate locations. In this display, line icons represent communication status. A line connecting USWest 902 to Canada 901 is an icon that provides status by changing color or blinking. In the example this line is green indicating that it is performing well. Another line USWest 902 to Australia 911 is red indicating that it is overloaded. The icon line from USWest 902 to USMID 903 is represented by a green broken line indicating an anomaly. The human user moves his cursor over that line 1201 and selects it. This results in detail box 1203 being displayed with more visualization information about the aggregate network status in that path. Similarly, selecting a line icon 1201 might result in a blown-up detailed map of the physical networks being used for that path.

Figure 13:
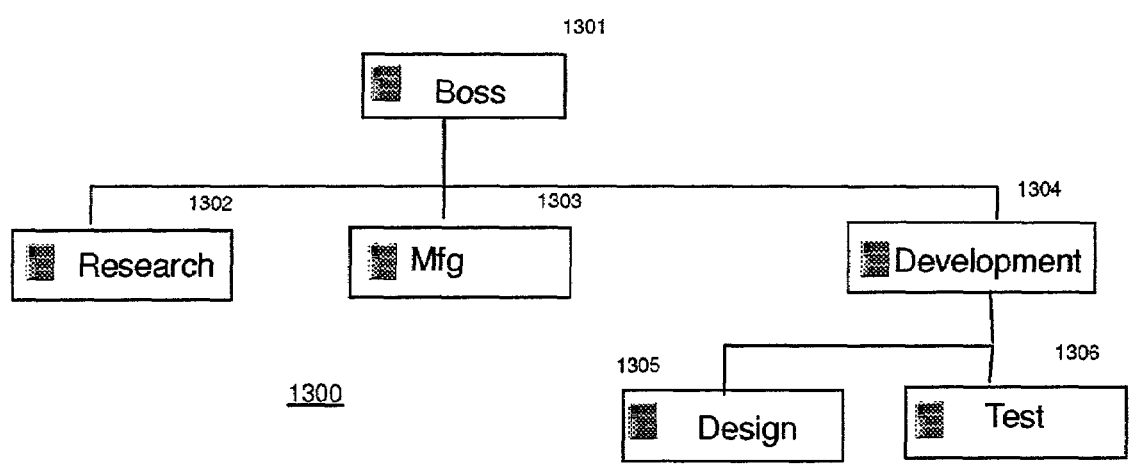
FIG. 13 is an example of an organizational Grid Visualization.
Figure 14:
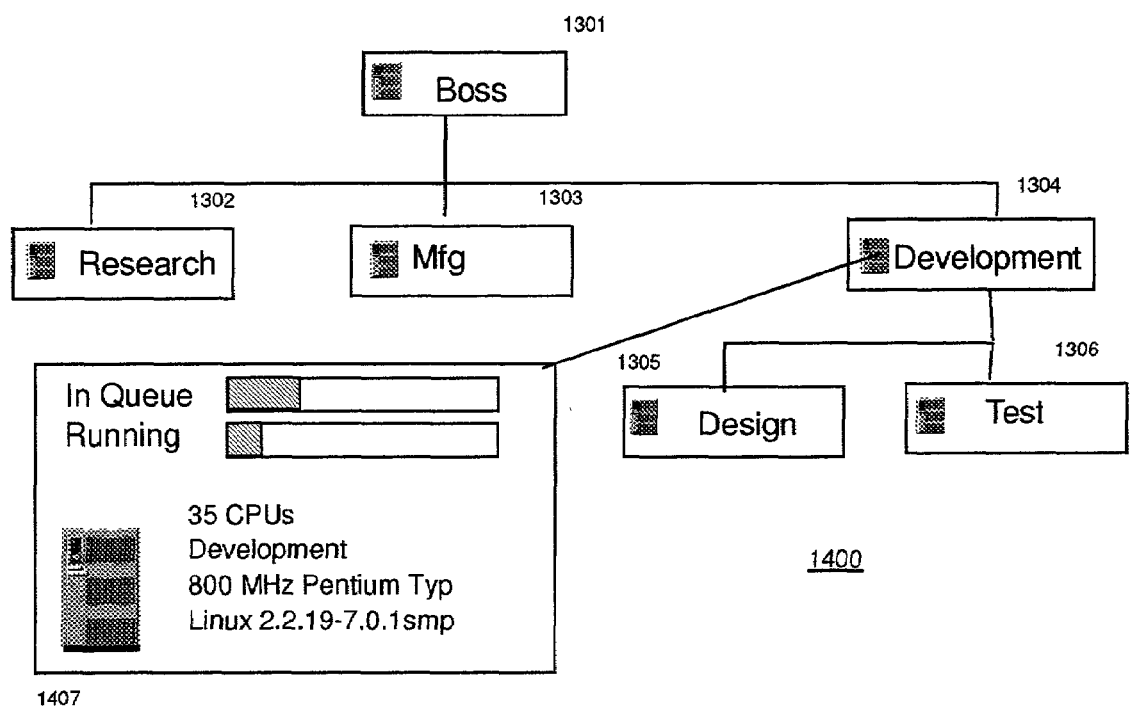
FIG. 14 is an example of a first detail of a Grid Visualization.

FIG. 13 shows another embodiment of the present invention. In this case an organizational Grid Group is displayed rather than a geographical one. The Organization is a Business and it is represented by Grid aggregate resources represented by a computer box and Grid aggregate networking interconnecting the organizational hierarchical entities of Boss 1301, Research 1302, Manufacturing (Mfg.) 1303, Development 1304, Design 1305 and Test 1306. The computer box icons within each department are colored or blinking to indicate the status of the aggregate of the grid resource within that department or in another embodiment, indicating the aggregate of grid resources of all departments reporting to that department. Clicking on any of the icons of computer boxes allows the user to drill down into more detail of the aggregated grid component. Similarly, the interconnecting network is made of line icons. The line icons are colored, shaped or blinking to represent different status. In FIG. 14, the human user has selected the grid box in the Development department 1301. This results in a window 1407 that provides various icons to provide more information about the grid component utilized by the Development department.

As shown, one view might present the overall status of the Grid resources on the East Coast while a more detailed view would show the status in a particular location such as Hawthorn, N.Y. These different presentations would be connected to the same data model of the grid but the presentation would be extremely different. One view would hide data while the other may aggregate data into one display attribute of a view object. This provides the ability to "see" the grid at various levels of detail and through different organizational structures or hierarchies.

Automatic vs Interactive

Using MVCT, diagrams present views of resources either automatically or interactively. Automatic views are created in response to the model itself without any user interaction. These are generated algorithmically based on the current grid state. In addition, these diagrams are augmented with specific views of data that are of particular interest to a user at any given time or with diagrams constructed completely by the user. The user selects data that is relevant to him/her then views are constructed dynamically that present the information that is most useful. For instance, status of a particular machine or resource (the user's job on the network) by allowing the user to easily construct a view object that is linked to that data element.

Attribute Filtering (Sorting)

Diagrams built with the MVCT are also visually filtered and sorted to display the most relevant information. Attributes such as position and size are altered with the MVCT architecture to visually highlight the data requested. For example, the user requests that all idle computers be shown and they then "float" to the top of the diagram and the more heavily loaded machines drop to the bottom of the diagram. Similarly, color, size, or transparency are used to depict the relevant data.

Parallel vs Desktop

MVCT is used to compare various computing options. Graphing the likely performance of a particular resource is simulated and compared against other resources or doing the job locally on the user's own machine.

Resources (Jobs, Computers, Etc)

Various resources exist on the grid (computers, jobs, managers, queues . . . ) and these objects have different representations in the system and are displayed differently depending on the resolution necessary. For example, a computer is represented as a dot with color on a high level display but shown in detail with descriptions and processor and queue loads explicitly shown. The invention is not limited to object oriented components and the creation of advertisements by peers, the capturing of status information by peers, the communication of advertisements by peers and the aggregation of status and presentation of views could be performed by non-object oriented programming means and still be in the spirit of the invention. Therefore, except for the objects comprising the MVC or MVCT architecture modules, a program object in the present invention is not necessarily an object created by object oriented programming.

Visualization of the present invention is not limited to Grid Computing. Any large system that has components with geographical or organizational relevance would find it advantageous to use the invention. Land, sea and air transportation networks would easily use the invention to portray an aggregate of vehicles, terminals and interconnecting routes on a map. Manufacturing systems would use the invention to aggregate manufacturing entities and movement between entities. Manufacturing systems would at a higher level use the invention to monitor supply chains, manufacturing locations and customer channels. Biological systems would use the system to monitor complex biological structures including micro organism systems, population studies. The population studies might include disease tracking, anomaly identification and monitoring of transmission of illness. There are any number of uses for the present invention, the invention provides a valuable way for a human to monitor large systems and to selectively inquire into details of a selected system component.

While the preferred embodiment of the invention has been illustrated and described herein, it is to be understood that the invention is not limited to the precise construction herein disclosed, and the right is reserved to all changes and modifications coming within the scope of the invention as defined in the appended claims.

What is claimed is:

1. A method for communicating data between objects in a Model-View-Controller (MVC) architecture program system including programmably interconnected MVC objects comprising a model object, a view object and a controller object, the method comprising the steps of:

a first object of the MVC objects creating first object data having a first form, the first form consisting of first attribute values for creating a second attribute for performing a second object function;

receiving at a transform object, the first object data from the first object;

the transform object transforming, according to a predefined plan, said first object data to second object data having a second form different from said first form, the second form consisting of the second attribute;

providing said second object data to a second object of the MVC objects; and the second object using the second object data to perform the second object function.

2. The method according to claim 1 further comprising the steps of:

said first object providing said first object data to said transform object; and said second object receiving said second object data from said transform object.

3. The method according to claim 1 wherein said view object comprises a widget.

4. The method according to claim 1 wherein the communicating between objects comprise messages sent between MVC objects.

5. The method according to claim 1 wherein any one of said first object data first form or said second object data second form consists of any one of any one of a variable type or an attribute selected from a group consisting of integer, Boolean, short, long, floating point, double, character, binary, string, time, position, size, value, texture, text, orientation, color, shape, audio, video transparency.

6. A method for communicating between objects in a Model-View-Controller (MVC) architecture program system including programmably interconnected MVC objects comprising a model object, a view object and a controller object, the method comprising the steps of:
the model object creating a first object data having a first form, the first form consisting of attribute values for creating a displayable attribute;
receiving at a transform object, the first object data from said model object;
the transform object transforming, according to a predefined plan, said first object data to second object data having a second form different from said first form, the second form consisting of the displayable attribute;
providing said second object data to said view object; and
the view object using the second object data to perform a view object function.

7. The method according to claim 6 wherein said first object data first form consists of any one of a variable type selected from one of integer, Boolean, short, long, floating point, double, character, binary, string, or time.

8. The method according to claim 7 wherein said second object data second form consists of any one of a user perceived attribute selected from one of position, size, value, texture, text, orientation, color, shape, audio, video or transparency.

9. The method according to claim 6 further comprising the steps of:
providing said first object data from said model object to said transform object; and
receiving at said view object, said second object data from said transform object.

10. The method according to claim 6 wherein the communicating between objects comprise messages sent between MVC objects.

11. A method for communicating between objects in a Model-View-Controller (MVC) architecture program system including programmably interconnected MVC objects comprising a model object, a view object and a controller object, the method comprising the steps of:
the controller object creating first object data having a first form, the first form consisting of first attribute values for creating a second attribute for performing a model object function;
receiving at a the transform object, the first object data from said controller object;
the transform object transforming, according to a predefined plan, said first object data to second object data having a second form, the second form consisting of the second attribute;
providing said second object data to said model object; and said model object using the second object data to perform the model object function.

12. The method according to claim 11 wherein said second object data consists of any one of a variable type selected from one of integer, Boolean, short, long, floating point, double, character, binary, string, and time.

13. The method according to claim 12 wherein said first object data consists of any one of a user provided attribute selected from one of mouse position, mouse state, keyboard entry, network message, audio, video, temperature or external sensor.

14. The method according to claim 11 further comprising the steps of:
providing said first object data from said controller object to said transform object; and
receiving at said model object, said second object data from said transform object.

15. The method according to claim 11 wherein the communicating between objects comprise messages sent between MVC objects.

16. A computer program product for communicating between objects in a Model-View-Controller (MVC) architecture program system including programmably interconnected MVC objects comprising a model object, a view object and a controller object, said computer program product comprising a computer readable medium having computer readable program code therein comprising:
computer readable program code for a first object of the MVC objects creating first object data having a first form, the first form consisting of first attribute values for creating a second attribute for performing a second object function;
computer readable program code for receiving at a transform object, the first object data from the first object;
computer readable program code for the transform object transforming, according to a predefined plan, said first object data to second object data having a second form, the second form consisting of the second attribute;
computer readable program code for providing said second object data to a second object of the MVC objects; and
computer readable program code for the second object using the second object data to perform the second object function.

17. The computer program product according to claim 16 wherein said computer readable program code in said computer readable medium further comprises:
computer readable program code for providing said first object data from said first object to said transform object; and
computer readable program code for receiving at said second object, said second object data from said transform object.

18. The computer program product according to claim 16 wherein said second object comprises a widget.

19. A computer program product for communicating between objects in a Model-View-Controller (MVC) architecture program system including programmably interconnected MVC objects comprising a model object, a view object and a controller object, said computer program product comprising a computer readable medium having computer readable program code therein in a computing system comprising:
computer readable program code for the model object creating a first object data having a first form, the first form consisting of first attribute values for creating a second attribute for performing a view obiect function;
computer readable program code for receiving at a transform object, the first object data from said model object;
computer readable program code for the transform object transforming, according to a predefined plan, said first object data to second object data having a second form, the second form consisting of the second attribute;

computer readable program code for providing said second object data to said view object; and computer readable program code for the view object using the second object data to perform the view object function.

20. The computer program product according to claim 19 wherein said computer readable program code in said computer readable medium further comprises:

computer readable program code for providing said first object data from said model object to said transform object; and computer readable program code for receiving at said view object, said second object data from said transform object.

21. The computer program product according to claim 19 wherein said first object data consists of any one of a variable type selected from one of integer, Boolean, short, long, floating point, double, character, binary, string, or time.

22. The computer program product according to claim 21 wherein said second object data consists of any one of a user perceived attribute selected from one of position, size, value, texture, text, orientation, color, shape, audio, video or transparency.

23. A computer program product for communicating between objects in a Model-View-Controller (MVC) architecture program system including programmably interconnected MVC objects comprising a model object, a view object and a controller object, said computer program product comprising a computer readable medium having computer readable program code therein comprising;

computer readable program code for the controller object creating first object data having a first form, the first form consisting of first attribute values for creating a second attribute for performing a model obiect function;

computer readable program code for receiving at the transform object, the first object data from said controller object;

computer readable program code for the transform object transforming, according to a predefined plan, said first object data to second object data having a second form, the second form consisting of the second attribute;

computer readable program code for providing said second object data to said model object;

computer readable program code for said model object using the second object data to perform the model object function.

24. The computer program product according to claim 23 wherein said second object data consists of any one of a variable type selected from one of integer, Boolean, short, long, floating point, double, character, binary, string, or time.

25. The computer program product according to claim 24 wherein said first object data consists of any one of a user provided attribute selected from one of mouse position, mouse state, keyboard entry, network message, audio, video, temperature or external sensor data.

26. The computer program product according to claim 23 wherein said computer readable program code in said computer readable medium further comprises:

computer readable program code for providing said first object data from said controller object to said transform object; and computer readable program code for receiving at said model object, said second object data from said transform object.

27. A system for communicating between objects in a Model-View-Controller (MVC) architecture program system including programmably interconnected MVC objects comprising a model object, a view object and a controller object, view object and controller object, the system comprising:

a first object for creating a first object data having a first form, the first form consisting of first attribute values for creating a second attribute for performing a second object function;

a first message receiver for receiving at a transform object, the first object data from the first object;

the transform object for transforming, according to a predefined plan, said first object data to second object data having a second form, the second form consisting of the second attribute;

a second object data provider for providing said second object data to a second object of the MVC objects; and the second object using the second object data to perform the second object function.

28. The system according to claim 27 further comprising:

a first message provider for said first object providing said first object data to said transform object; and a second message receiver for said second object receiving said second object data from said transform object.

29. A system for communicating between objects in a Model-View-Controller (MVC) architecture program system including programmably interconnected MVC objects comprising a model object, a view object and a controller object, the system comprising:

the model object creating a first object data having a first form, the first form consisting of first attribute values for creating a second attribute for performing a view object function;

a receiver receiving at a transform object, the first object data from said model object;

the transform object transforming, according to a predefined plan, said first object data to second object data having a second form different from said first form, the second form consisting of the second attribute;

a provider providing said second object data to said view object;

the view object using the second object data to perform the view object function.

30. The system according to claim 29 wherein said first object data consists of any one of a variable type selected from one of integer, Boolean, short, long, floating point, double, character, binary, string, or time.

31. The system according to claim 30 wherein said second object data consists of any one of a user perceived attribute selected from one of position, size, value, texture, text, orientation, color, shape, audio, video or transparency.

32. The system according to claim 29 further comprising:

a first object provider providing said first object data from said model object to said transform object; and a second object receiver for receiving at said view object, said second object data from said transform object.

33. A system for communicating between objects in a Model-View-Controller (MVC) architecture program system including programmably interconnected MVC objects comprising a model object, a view object and a controller object, view object and controller object, the system comprising:

the controller object creating a first object data having a first form, the first form consisting of first attribute values for creating a second attribute for performing a model object function;

receiving at a transform object, the first from said controller object;

the transform object transforming, according to a predefined plan, said first object data to second object data having a second form, the second form consisting of the second attribute;

a provider providing said second object data to said model object;

said model object using the second object data to perform the model object function.

34. The system according to claim 33 wherein said second object data consists of any one of a variable type selected from one of integer, Boolean, short, long, floating point, double, character, binary, string, or time.

35. The system according to claim 34 wherein said first object data consists of any one of a user provided attribute selected from one of mouse position, mouse state, keyboard entry, network message, audio, video, temperature or external sensor data.

36. The system according to claim 33 further comprising:

a first object provider for providing said first object data from said controller object to said transform object; and a second object receiver for receiving at said model object, said second object data from said transform object.

* * * * *